(12) United States Patent
Ang et al.

(10) Patent No.: US 11,995,024 B2
(45) Date of Patent: May 28, 2024

(54) STATE SHARING BETWEEN SMART NICs

(71) Applicant: VMware LLC, Palo Alto, CA (US)

(72) Inventors: Boon S. Ang, Saratoga, CA (US);
Wenyi Jiang, Fremont, CA (US);
Guolin Yang, San Jose, CA (US); Jin Heo, Los Altos, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/560,148

(22) Filed: Dec. 22, 2021

(65) Prior Publication Data

US 2023/0195675 A1 Jun. 22, 2023

(51) Int. Cl.
*G06F 13/42* (2006.01)
*G06F 13/38* (2006.01)

(52) U.S. Cl.
CPC ........ *G06F 13/4282* (2013.01); *G06F 13/387* (2013.01); *G06F 2213/0026* (2013.01); *G06F 2213/3808* (2013.01)

(58) Field of Classification Search
CPC ............... G06F 13/387; G06F 13/4282; G06F 2213/0026; G06F 2213/3808
See application file for complete search history.

(56) References Cited

U.S. PATENT DOCUMENTS

| | | | |
|---|---|---|---|
| 5,884,313 A | 3/1999 | Talluri et al. | |
| 5,887,134 A | 3/1999 | Ebrahim | |
| 5,974,547 A | 10/1999 | Klimenko | |
| 6,141,749 A | 10/2000 | Coss et al. | |
| 6,219,699 B1 | 4/2001 | McCloghrie et al. | |
| 6,393,483 B1 | 5/2002 | Latif et al. | |
| 6,496,935 B1 | 12/2002 | Fink et al. | |
| 6,594,704 B1 | 7/2003 | Birenback et al. | |
| 6,738,821 B1 | 5/2004 | Wilson et al. | |
| 6,856,995 B1 | 2/2005 | Ibitayo et al. | |
| 6,880,089 B1 | 4/2005 | Bommareddy et al. | |
| 6,963,921 B1 | 11/2005 | Yang et al. | |
| 7,055,173 B1 | 5/2006 | Chaganty et al. | |
| 7,079,544 B2 | 7/2006 | Wakayama et al. | |
| 7,136,926 B1 | 11/2006 | Iyer et al. | |

(Continued)

FOREIGN PATENT DOCUMENTS

| | | |
|---|---|---|
| CA | 2672100 A1 | 6/2008 |
| CA | 2918551 A1 | 7/2010 |

(Continued)

OTHER PUBLICATIONS

Anwer, Muhammad Bilal, et al., "Building A Fast, Virtualized Data Plane with Programmable Hardware," Aug. 17, 2009, 8 pages, VISA'09, ACM, Barcelona, Spain.

(Continued)

*Primary Examiner* — Eric T Oberly
(74) *Attorney, Agent, or Firm* — Quarles & Brady LLP

(57) ABSTRACT

Some embodiments provide a method for synchronizing state between multiple smart NICs of a host computer that perform operations using dynamic state information. At a first smart NIC of the plurality of smart NICs, the method stores a set of dynamic state information. The method synchronizes the set of dynamic state information across a communication channel that connects the smart NICs so that each of the smart NICs also stores the set of dynamic state information.

19 Claims, 21 Drawing Sheets

(56) References Cited

U.S. PATENT DOCUMENTS

| | | |
|---|---|---|
| 7,349,382 B2 | 3/2008 | Marimuthu et al. |
| 7,424,710 B1 | 9/2008 | Nelson et al. |
| 7,512,071 B2 | 3/2009 | Goldschmidt et al. |
| 7,606,260 B2 | 10/2009 | Oguchi et al. |
| 7,760,733 B1 | 7/2010 | Eiriksson et al. |
| 7,774,502 B2 | 8/2010 | Murthy et al. |
| 7,818,452 B2 | 10/2010 | Matthews et al. |
| 7,849,168 B2 | 12/2010 | Utsunomiya et al. |
| 7,853,998 B2 | 12/2010 | Blaisdell et al. |
| 7,913,294 B1 | 3/2011 | Maufer et al. |
| 7,948,986 B1 | 5/2011 | Ghosh et al. |
| 8,032,933 B2 | 10/2011 | Turley et al. |
| 8,108,550 B2 | 1/2012 | Lahoti et al. |
| 8,145,768 B1 | 3/2012 | Hawthorne |
| 8,190,767 B1 | 5/2012 | Maufer et al. |
| 8,194,674 B1 | 6/2012 | Pagel et al. |
| 8,346,919 B1* | 1/2013 | Eiriksson ............... H04L 69/14 |
| | | 714/4.11 |
| 8,365,294 B2 | 1/2013 | Ross |
| 8,442,059 B1 | 5/2013 | Iglesia et al. |
| 8,615,009 B1 | 12/2013 | Ramamoorthi et al. |
| 8,660,129 B1 | 2/2014 | Brendel et al. |
| 8,825,900 B1 | 9/2014 | Gross, IV et al. |
| 8,856,518 B2 | 10/2014 | Sridharan et al. |
| 8,930,529 B1 | 1/2015 | Wang et al. |
| 8,931,047 B2 | 1/2015 | Wanser et al. |
| 9,008,082 B2 | 4/2015 | Dyke |
| 9,008,085 B2 | 4/2015 | Kamble et al. |
| 9,015,823 B2 | 4/2015 | Koponen et al. |
| 9,047,109 B1 | 6/2015 | Wang et al. |
| 9,116,727 B2 | 8/2015 | Benny et al. |
| 9,135,044 B2 | 9/2015 | Maharana |
| 9,143,582 B2 | 9/2015 | Banavalikar et al. |
| 9,148,895 B2 | 9/2015 | PalChaudhuri et al. |
| 9,152,593 B2 | 10/2015 | Galles |
| 9,154,327 B1 | 10/2015 | Marino et al. |
| 9,197,551 B2 | 11/2015 | DeCusatis et al. |
| 9,231,849 B2 | 1/2016 | Hyoudou et al. |
| 9,325,739 B1 | 4/2016 | Roth et al. |
| 9,378,161 B1 | 6/2016 | Dalal et al. |
| 9,380,027 B1 | 6/2016 | Lian et al. |
| 9,419,897 B2 | 8/2016 | Cherian et al. |
| 9,460,031 B1 | 10/2016 | Dalal et al. |
| 9,621,516 B2 | 4/2017 | Basak et al. |
| 9,634,990 B2 | 4/2017 | Lee |
| 9,692,698 B2 | 6/2017 | Cherian et al. |
| 9,729,512 B2 | 8/2017 | Jain et al. |
| 9,755,903 B2 | 9/2017 | Masurekar et al. |
| 9,806,948 B2 | 10/2017 | Masurekar et al. |
| 9,825,913 B2 | 11/2017 | Jain et al. |
| 9,916,269 B1 | 3/2018 | Machulsky et al. |
| 10,050,884 B1* | 8/2018 | Dhanabalan ........ H04L 43/0864 |
| 10,142,127 B2 | 11/2018 | Cherian et al. |
| 10,162,793 B1 | 12/2018 | BShara et al. |
| 10,193,771 B2 | 1/2019 | Koponen et al. |
| 10,284,478 B2 | 5/2019 | Yokota |
| 10,341,296 B2 | 7/2019 | Bhagwat et al. |
| 10,534,629 B1 | 1/2020 | Pierre et al. |
| 10,567,308 B1 | 2/2020 | Subbiah et al. |
| 10,873,566 B2 | 12/2020 | Han |
| 10,997,106 B1* | 5/2021 | Bandaru ............... G06F 13/385 |
| 11,005,755 B2 | 5/2021 | Yu et al. |
| 11,019,030 B2 | 5/2021 | Jain et al. |
| 11,038,845 B2 | 6/2021 | Han |
| 11,108,593 B2 | 8/2021 | Cherian et al. |
| 11,221,972 B1 | 1/2022 | Raman et al. |
| 11,385,981 B1 | 7/2022 | Silakov et al. |
| 11,593,278 B2 | 2/2023 | Kim et al. |
| 11,606,310 B2 | 3/2023 | Ang et al. |
| 11,636,053 B2 | 4/2023 | Kim et al. |
| 11,677,719 B2 | 6/2023 | Han |
| 11,716,383 B2 | 8/2023 | Kim et al. |
| 2002/0069245 A1 | 6/2002 | Kim |
| 2003/0005144 A1 | 1/2003 | Engel et al. |
| 2003/0093481 A1 | 5/2003 | Mitchell et al. |
| 2003/0097589 A1 | 5/2003 | Syvanne |
| 2003/0123452 A1 | 7/2003 | Cox et al. |
| 2003/0130833 A1 | 7/2003 | Brownell et al. |
| 2003/0140124 A1 | 7/2003 | Burns |
| 2003/0145114 A1 | 7/2003 | Gertner |
| 2003/0161272 A1 | 8/2003 | Teplitsky |
| 2003/0200290 A1 | 10/2003 | Zimmerman et al. |
| 2003/0212900 A1 | 11/2003 | Liu et al. |
| 2003/0217119 A1 | 11/2003 | Raman et al. |
| 2004/0022259 A1 | 2/2004 | Tuchow |
| 2004/0042464 A1* | 3/2004 | Elzur ................... H04L 69/162 |
| | | 370/235 |
| 2004/0049701 A1 | 3/2004 | Pennec et al. |
| 2005/0053079 A1 | 3/2005 | Havala |
| 2005/0114337 A1 | 5/2005 | Lunteren |
| 2005/0198125 A1 | 9/2005 | Beck et al. |
| 2005/0229246 A1 | 10/2005 | Rajagopal et al. |
| 2005/0238022 A1 | 10/2005 | Panigrahy |
| 2006/0002386 A1 | 1/2006 | Yik et al. |
| 2006/0029056 A1 | 2/2006 | Perera et al. |
| 2006/0041894 A1 | 2/2006 | Cheng et al. |
| 2006/0191003 A1 | 8/2006 | Bahk et al. |
| 2006/0206603 A1 | 9/2006 | Rajan et al. |
| 2006/0206655 A1 | 9/2006 | Chappell et al. |
| 2006/0236054 A1 | 10/2006 | Kitamura |
| 2007/0011734 A1 | 1/2007 | Balakrishnan et al. |
| 2007/0056038 A1 | 3/2007 | Lok |
| 2007/0061492 A1 | 3/2007 | Riel |
| 2007/0174850 A1 | 7/2007 | Zur |
| 2008/0008202 A1 | 1/2008 | Terrell et al. |
| 2008/0028097 A1 | 1/2008 | Makela |
| 2008/0072305 A1 | 3/2008 | Casado et al. |
| 2008/0086620 A1 | 4/2008 | Morris |
| 2008/0163207 A1 | 7/2008 | Reumann et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2009/0007251 A1 | 1/2009 | Abzarian et al. |
| 2009/0089537 A1 | 4/2009 | Vick et al. |
| 2009/0119087 A1 | 5/2009 | Ang et al. |
| 2009/0129271 A1 | 5/2009 | Ramankutty et al. |
| 2009/0129394 A1 | 5/2009 | Bar-Kovetz et al. |
| 2009/0150521 A1 | 6/2009 | Tripathi |
| 2009/0161547 A1 | 6/2009 | Riddle et al. |
| 2009/0161673 A1 | 6/2009 | Breslau et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0327781 A1 | 12/2009 | Tripathi |
| 2010/0014526 A1 | 1/2010 | Chavan et al. |
| 2010/0037311 A1 | 2/2010 | He et al. |
| 2010/0070677 A1 | 3/2010 | Thakkar |
| 2010/0100616 A1 | 4/2010 | Bryson et al. |
| 2010/0115174 A1 | 5/2010 | Akyol et al. |
| 2010/0115208 A1 | 5/2010 | Logan |
| 2010/0125667 A1 | 5/2010 | Soundararajan |
| 2010/0165874 A1 | 7/2010 | Brown et al. |
| 2010/0257580 A1 | 10/2010 | Zhao |
| 2010/0275199 A1 | 10/2010 | Smith et al. |
| 2010/0287306 A1 | 11/2010 | Matsuda |
| 2011/0016467 A1 | 1/2011 | Kane |
| 2011/0022695 A1 | 1/2011 | Dalal et al. |
| 2011/0060859 A1 | 3/2011 | Shukla et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0134920 A1 | 6/2011 | Dyke |
| 2011/0219170 A1 | 9/2011 | Frost et al. |
| 2011/0225647 A1 | 9/2011 | Dilley et al. |
| 2011/0246637 A1 | 10/2011 | Murakami |
| 2012/0042138 A1 | 2/2012 | Eguchi et al. |
| 2012/0072909 A1 | 3/2012 | Malik et al. |
| 2012/0079478 A1 | 3/2012 | Galles et al. |
| 2012/0096459 A1 | 4/2012 | Miyazaki |
| 2012/0163388 A1 | 6/2012 | Goel et al. |
| 2012/0167082 A1 | 6/2012 | Kumar et al. |
| 2012/0207039 A1 | 8/2012 | Srinivasan et al. |
| 2012/0207174 A1 | 8/2012 | Shieh |
| 2012/0240182 A1 | 9/2012 | Narayanaswamy et al. |

(56) References Cited

U.S. PATENT DOCUMENTS

| | | |
|---|---|---|
| 2012/0259953 A1 | 10/2012 | Gertner |
| 2012/0278584 A1 | 11/2012 | Nagami et al. |
| 2012/0290703 A1 | 11/2012 | Barabash et al. |
| 2012/0320918 A1 | 12/2012 | Fomin et al. |
| 2013/0007740 A1 | 1/2013 | Kikuchi et al. |
| 2013/0033993 A1 | 2/2013 | Cardona et al. |
| 2013/0044631 A1 | 2/2013 | Biswas et al. |
| 2013/0058346 A1 | 3/2013 | Sridharan et al. |
| 2013/0061047 A1 | 3/2013 | Sridharan et al. |
| 2013/0073702 A1 | 3/2013 | Umbehocker |
| 2013/0073743 A1 | 3/2013 | Ramasamy et al. |
| 2013/0125122 A1 | 5/2013 | Hansen |
| 2013/0125230 A1 | 5/2013 | Koponen et al. |
| 2013/0145106 A1 | 6/2013 | Kan |
| 2013/0163594 A1 | 6/2013 | Sharma et al. |
| 2013/0227097 A1 | 8/2013 | Yasuda et al. |
| 2013/0227550 A1 | 8/2013 | Weinstein et al. |
| 2013/0265883 A1 | 10/2013 | Henry et al. |
| 2013/0311663 A1 | 11/2013 | Kamath et al. |
| 2013/0318219 A1 | 11/2013 | Kancherla |
| 2013/0318268 A1 | 11/2013 | Dalal et al. |
| 2013/0332983 A1 | 12/2013 | Koorevaar et al. |
| 2013/0346583 A1 | 12/2013 | Low et al. |
| 2014/0003442 A1 | 1/2014 | Hernandez et al. |
| 2014/0056151 A1 | 2/2014 | Petrus et al. |
| 2014/0067763 A1 | 3/2014 | Jorapurkar et al. |
| 2014/0068602 A1 | 3/2014 | Gember et al. |
| 2014/0074799 A1 | 3/2014 | Karampuri et al. |
| 2014/0098815 A1 | 4/2014 | Mishra et al. |
| 2014/0115578 A1 | 4/2014 | Cooper et al. |
| 2014/0123211 A1 | 5/2014 | Wanser et al. |
| 2014/0164595 A1 | 6/2014 | Bray et al. |
| 2014/0195666 A1 | 7/2014 | Dumitriu et al. |
| 2014/0201305 A1 | 7/2014 | Dalal et al. |
| 2014/0208075 A1 | 7/2014 | McCormick, Jr. |
| 2014/0215036 A1 | 7/2014 | Elzur |
| 2014/0244983 A1 | 8/2014 | McDonald et al. |
| 2014/0245296 A1 | 8/2014 | Sethuramalingam et al. |
| 2014/0245423 A1 | 8/2014 | Lee |
| 2014/0269712 A1 | 9/2014 | Kidambi |
| 2014/0269754 A1 | 9/2014 | Eguchi et al. |
| 2014/0281030 A1 | 9/2014 | Cui et al. |
| 2014/0282855 A1 | 9/2014 | Clark et al. |
| 2014/0330977 A1 | 11/2014 | Bemmel |
| 2014/0373148 A1 | 12/2014 | Nelms et al. |
| 2014/0376367 A1 | 12/2014 | Jain et al. |
| 2015/0007317 A1 | 1/2015 | Jain |
| 2015/0016300 A1 | 1/2015 | Devireddy et al. |
| 2015/0019748 A1 | 1/2015 | Gross, IV et al. |
| 2015/0020067 A1 | 1/2015 | Brant et al. |
| 2015/0033222 A1 | 1/2015 | Hussain et al. |
| 2015/0052280 A1 | 2/2015 | Lawson |
| 2015/0082417 A1 | 3/2015 | Bhagwat et al. |
| 2015/0117445 A1* | 4/2015 | Koponen ............... H04L 49/70 370/389 |
| 2015/0156250 A1 | 6/2015 | Varshney et al. |
| 2015/0172183 A1 | 6/2015 | DeCusatis et al. |
| 2015/0200808 A1 | 7/2015 | Gourlay et al. |
| 2015/0212892 A1 | 7/2015 | Li et al. |
| 2015/0215207 A1 | 7/2015 | Qin et al. |
| 2015/0222547 A1 | 8/2015 | Hayut et al. |
| 2015/0237013 A1 | 8/2015 | Bansal et al. |
| 2015/0242134 A1 | 8/2015 | Takada et al. |
| 2015/0261556 A1 | 9/2015 | Jain et al. |
| 2015/0261720 A1 | 9/2015 | Kagan et al. |
| 2015/0281178 A1 | 10/2015 | Raman et al. |
| 2015/0281179 A1 | 10/2015 | Raman et al. |
| 2015/0326532 A1 | 11/2015 | Grant et al. |
| 2015/0347231 A1 | 12/2015 | Gopal et al. |
| 2015/0358288 A1 | 12/2015 | Jain et al. |
| 2015/0358290 A1 | 12/2015 | Jain et al. |
| 2015/0381494 A1 | 12/2015 | Cherian et al. |
| 2015/0381495 A1 | 12/2015 | Cherian et al. |
| 2016/0006696 A1 | 1/2016 | Donley et al. |
| 2016/0092108 A1 | 3/2016 | Karaje et al. |
| 2016/0134702 A1 | 5/2016 | Gertner |
| 2016/0142320 A1 | 5/2016 | Gyllenhammer et al. |
| 2016/0156591 A1 | 6/2016 | Zhou et al. |
| 2016/0162302 A1 | 6/2016 | Warszawski et al. |
| 2016/0162438 A1 | 6/2016 | Hussain et al. |
| 2016/0179579 A1 | 6/2016 | Amann et al. |
| 2016/0182342 A1 | 6/2016 | Singaravelu et al. |
| 2016/0239330 A1 | 8/2016 | Bride et al. |
| 2016/0285913 A1 | 9/2016 | Itskin et al. |
| 2016/0294858 A1 | 10/2016 | Woolward et al. |
| 2016/0306648 A1 | 10/2016 | Deguillard et al. |
| 2017/0005986 A1 | 1/2017 | Bansal et al. |
| 2017/0024334 A1 | 1/2017 | Bergsten et al. |
| 2017/0075845 A1 | 3/2017 | Kopparthi |
| 2017/0093623 A1 | 3/2017 | Zheng |
| 2017/0099532 A1 | 4/2017 | Kakande |
| 2017/0104790 A1 | 4/2017 | Meyers et al. |
| 2017/0118173 A1 | 4/2017 | Arramreddy et al. |
| 2017/0134433 A1 | 5/2017 | Hugenbruch et al. |
| 2017/0161090 A1 | 6/2017 | Kodama |
| 2017/0161189 A1 | 6/2017 | Gertner |
| 2017/0180273 A1 | 6/2017 | Daly et al. |
| 2017/0180414 A1 | 6/2017 | Andrews et al. |
| 2017/0187679 A1 | 6/2017 | Basak et al. |
| 2017/0195454 A1 | 7/2017 | Shieh |
| 2017/0208100 A1 | 7/2017 | Lian et al. |
| 2017/0214549 A1 | 7/2017 | Yoshino et al. |
| 2017/0244671 A1 | 8/2017 | Kamalakantha et al. |
| 2017/0244673 A1 | 8/2017 | Han |
| 2017/0244674 A1 | 8/2017 | Han |
| 2017/0264622 A1 | 9/2017 | Cooper et al. |
| 2017/0295033 A1 | 10/2017 | Cherian et al. |
| 2018/0024775 A1 | 1/2018 | Miller |
| 2018/0024964 A1 | 1/2018 | Mao et al. |
| 2018/0032249 A1 | 2/2018 | Makhervaks et al. |
| 2018/0088978 A1 | 3/2018 | Li et al. |
| 2018/0095872 A1 | 4/2018 | Dreier et al. |
| 2018/0097778 A1 | 4/2018 | Jain et al. |
| 2018/0109471 A1 | 4/2018 | Chang et al. |
| 2018/0152540 A1 | 5/2018 | Niell et al. |
| 2018/0260125 A1 | 9/2018 | Botes et al. |
| 2018/0262599 A1 | 9/2018 | Firestone |
| 2018/0278684 A1 | 9/2018 | Rashid et al. |
| 2018/0309641 A1 | 10/2018 | Wang et al. |
| 2018/0309718 A1 | 10/2018 | Zuo |
| 2018/0329743 A1 | 11/2018 | Pope et al. |
| 2018/0331976 A1 | 11/2018 | Pope et al. |
| 2018/0336346 A1 | 11/2018 | Guenther |
| 2018/0337991 A1 | 11/2018 | Kumar et al. |
| 2018/0349037 A1 | 12/2018 | Zhao et al. |
| 2018/0359215 A1 | 12/2018 | Khare et al. |
| 2019/0042506 A1 | 2/2019 | Devey et al. |
| 2019/0044809 A1 | 2/2019 | Willis et al. |
| 2019/0044866 A1 | 2/2019 | Chilikin et al. |
| 2019/0075063 A1 | 3/2019 | McDonnell et al. |
| 2019/0132296 A1 | 5/2019 | Jiang et al. |
| 2019/0158396 A1 | 5/2019 | Yu et al. |
| 2019/0173689 A1 | 6/2019 | Cherian et al. |
| 2019/0200105 A1 | 6/2019 | Cheng et al. |
| 2019/0235909 A1 | 8/2019 | Jin et al. |
| 2019/0278675 A1 | 9/2019 | Bolkhovitin et al. |
| 2019/0280980 A1 | 9/2019 | Hyoudou |
| 2019/0286373 A1 | 9/2019 | Karumbunathan et al. |
| 2019/0306083 A1 | 10/2019 | Shih et al. |
| 2020/0021532 A1 | 1/2020 | Borikar et al. |
| 2020/0028800 A1 | 1/2020 | Strathman et al. |
| 2020/0042234 A1 | 2/2020 | Krasner et al. |
| 2020/0042389 A1 | 2/2020 | Kulkarni et al. |
| 2020/0042412 A1 | 2/2020 | Kulkarni et al. |
| 2020/0133909 A1 | 4/2020 | Hefty et al. |
| 2020/0136996 A1 | 4/2020 | Li et al. |
| 2020/0213227 A1 | 7/2020 | Pianigiani et al. |
| 2020/0259731 A1 | 8/2020 | Sivaraman et al. |
| 2020/0278892 A1* | 9/2020 | Nainar ............... H04L 67/10 |
| 2020/0278893 A1 | 9/2020 | Niell et al. |
| 2020/0314011 A1 | 10/2020 | Deval et al. |
| 2020/0319812 A1 | 10/2020 | He et al. |
| 2020/0328192 A1 | 10/2020 | Zaman et al. |
| 2020/0382329 A1 | 12/2020 | Yuan |

(56) References Cited

U.S. PATENT DOCUMENTS

| | | |
|---|---|---|
| 2020/0401320 A1 | 12/2020 | Pyati et al. |
| 2020/0412659 A1 | 12/2020 | Ilitzky et al. |
| 2021/0019270 A1 | 1/2021 | Li et al. |
| 2021/0026670 A1 | 1/2021 | Krivenok et al. |
| 2021/0058342 A1 | 2/2021 | McBrearty |
| 2021/0176212 A1 | 6/2021 | Han |
| 2021/0226846 A1 | 7/2021 | Ballard et al. |
| 2021/0232528 A1 | 7/2021 | Kutch et al. |
| 2021/0266259 A1 | 8/2021 | Renner, III et al. |
| 2021/0273911 A1 | 9/2021 | Jain et al. |
| 2021/0314232 A1 | 10/2021 | Nainar et al. |
| 2021/0357242 A1 | 11/2021 | Ballard et al. |
| 2021/0377166 A1 | 12/2021 | Brar et al. |
| 2021/0377188 A1 | 12/2021 | Ghag et al. |
| 2021/0392017 A1 | 12/2021 | Cherian et al. |
| 2021/0409317 A1 | 12/2021 | Seshan et al. |
| 2022/0027147 A1 | 1/2022 | Maddukuri et al. |
| 2022/0043572 A1 | 2/2022 | Said et al. |
| 2022/0100432 A1 | 3/2022 | Kim et al. |
| 2022/0100491 A1 | 3/2022 | Voltz et al. |
| 2022/0100542 A1 | 3/2022 | Voltz |
| 2022/0100544 A1 | 3/2022 | Voltz |
| 2022/0100545 A1 | 3/2022 | Cherian et al. |
| 2022/0100546 A1 | 3/2022 | Cherian et al. |
| 2022/0103478 A1 | 3/2022 | Ang et al. |
| 2022/0103487 A1 | 3/2022 | Ang et al. |
| 2022/0103488 A1 | 3/2022 | Wang et al. |
| 2022/0103490 A1 | 3/2022 | Kim et al. |
| 2022/0103629 A1 | 3/2022 | Cherian et al. |
| 2022/0150055 A1 | 5/2022 | Cui et al. |
| 2022/0164451 A1 | 5/2022 | Bagwell |
| 2022/0197681 A1 | 6/2022 | Rajagopal |
| 2022/0206908 A1* | 6/2022 | Brar .................. G06F 11/0712 |
| 2022/0206962 A1 | 6/2022 | Kim et al. |
| 2022/0206964 A1 | 6/2022 | Kim et al. |
| 2022/0210229 A1* | 6/2022 | Maddukuri ........... G06F 9/3877 |
| 2022/0231968 A1 | 7/2022 | Rajagopal |
| 2022/0272039 A1 | 8/2022 | Cardona et al. |
| 2022/0335563 A1 | 10/2022 | Elzur |
| 2023/0004508 A1* | 1/2023 | Liu ......................... G06F 13/20 |
| 2023/0195488 A1 | 6/2023 | Ang et al. |
| 2023/0198833 A1 | 6/2023 | Ang et al. |

FOREIGN PATENT DOCUMENTS

| | | |
|---|---|---|
| CN | 101258725 A | 9/2008 |
| CN | 101540826 A | 9/2009 |
| DE | 102018004046 A1 | 11/2018 |
| EP | 1482711 A2 | 12/2004 |
| EP | 2748750 A1 | 7/2014 |
| EP | 3598291 A1 | 1/2020 |
| EP | 4160424 A2 | 4/2023 |
| TW | 202107297 A | 2/2021 |
| WO | 2005099201 A2 | 10/2005 |
| WO | 2007036372 A1 | 4/2007 |
| WO | 2008095010 A1 | 8/2008 |
| WO | 2010008984 A2 | 1/2010 |
| WO | 2013074828 A1 | 5/2013 |
| WO | 2015187201 A1 | 12/2015 |
| WO | 2016003489 A1 | 1/2016 |
| WO | 2020027913 A1 | 2/2020 |
| WO | 2020211071 A1 | 10/2020 |
| WO | 2021030020 A1 | 2/2021 |
| WO | 2022066267 A1 | 3/2022 |
| WO | 2022066268 A1 | 3/2022 |
| WO | 2022066270 A1 | 3/2022 |
| WO | 2022066271 A1 | 3/2022 |
| WO | 2022066531 A1 | 3/2022 |
| WO | 2023121720 A1 | 6/2023 |

OTHER PUBLICATIONS

Author Unknown, "8.6 Receive-Side Scaling (RSS)," Month Unknown 2020, 2 pages, Red Hat, Inc.

Author Unknown, "An Introduction to SmartNICs" The Next Platform, Mar. 4, 2019, 4 pages, retrieved from https://www.nextplatform.com/2019/03/04/an-introduction-to-smartnics/.

Author Unknown, "In-Hardware Storage Virtualization—NVMe SNAP™ Revolutionizes Data Center Storage: Composable Storage Made Simple," Month Unknown 2019, 3 pages, Mellanox Technologies, Sunnyvale, CA, USA.

Author Unknown, "Package Manager," Wikipedia, Sep. 8, 2020, 10 pages.

Author Unknown, "VMDK", Wikipedia, May 17, 2020, 3 pages, retrieved from https://en.wikipedia.org/w/index.php?title=VMDK&oldid=957225521.

Author Unknown, "vSAN Planning and Deployment" Update 3, Aug. 20, 2019, 85 pages, VMware, Inc., Palo Alto, CA, USA.

Author Unknown, "vSphere Managed Inventory Objects," Aug. 3, 2020, 3 pages, retrieved from https://docs.vmware.com/en/VMware-vSphere/6.7/com.vmware.vsphere.vcenterhost.doc/GUID-4D4B3DF2-D033-4782-A030-3C3600DE5A7F.html, VMware, Inc.

Author Unknown, "What is End-to-End Encryption and How does it Work?," Mar. 7, 2018, 4 pages, Proton Technologies AG, Geneva, Switzerland.

Author Unknown, "Network Functions Virtualisation; Infrastructure Architecture; Architecture of the Hypervisor Domain," Draft ETSI GS NFV-INF 004 V0.3.1, May 28, 2014, 50 pages, France.

Grant, Stewart, et al., "SmartNIC Performance Isolation with FairNIC: Programmable Networking for the Cloud," SIGCOMM '20, Aug. 10-14, 2020, 13 pages, ACM, Virtual Event, USA.

Harris, Jim, "Accelerating NVME-oF* for VMs with the Storage Performance Development Kit," Flash Memory Summit, Aug. 2017, 18 pages, Intel Corporation, Santa Clara, CA.

Herbert, Tom, et al., "Scaling in the Linux Networking Stack," Jun. 2, 2020, retrieved from https://01.org/linuxgraphics/gfx-docs/drm/networking/scaling.html.

Koponen, Teemu, et al., "Network Virtualization in Multi-tenant Datacenters," Technical Report TR-2013-001E, Aug. 2013, 22 pages, VMware, Inc., Palo Alto, CA, USA.

Le Vasseur, Joshua, et al., "Standardized but Flexible I/O for Self-Virtualizing Devices," Month Unknown 2008, 7 pages.

Liu, Ming, et al., "Offloading Distributed Applications onto SmartNICs using iPipe," SIGCOMM '19, Aug. 19-23, 2019, 16 pages, ACM, Beijing, China.

Non-Published Commonly Owned U.S. Appl. No. 17/145,319, filed Jan. 9, 2021, 70 pages, VMware, Inc.

Non-Published Commonly Owned U.S. Appl. No. 17/145,334, filed Jan. 9, 2021, 49 pages, VMware, Inc.

Non-Published Commonly Owned Related U.S. Appl. No. 17/560,142 with similar specification, filed Dec. 22, 2021, 60 pages, VMware, Inc.

Non-Published Commonly Owned Related U.S. Appl. No. 17/560,153 with similar specification, filed Dec. 22, 2021, 59 pages, VMware, Inc.

Perlroth, Nicole, "What is End-to-End Encryption? Another Bull's-Eye on Big Tech," The New York Times, Nov. 19, 2019, 4 pages, retrieved from https://nytimes.com/2019/11/19/technology/end-to-end-encryption.html.

Peterson, Larry L., et al., "OS Support for General-Purpose Routers," Month Unknown 1999, 6 pages, Department of Computer Science, Princeton University.

Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.

Spalink, Tammo, et al., "Building a Robust Software-Based Router Using Network Processors," Month Unknown 2001, 14 pages, ACM, Banff, Canada.

Stringer, Joe, et al., "OVS Hardware Offloads Discussion Panel," Nov. 7, 2016, 37 pages, retrieved from http://openvswitch.org/support/ovscon2016/7/1450-stringer.pdf.

Suarez, Julio, "Reduce TCO with Arm Based SmartNICs," Nov. 14, 2019, 12 pages, retrieved from https://community.arm.com/arm-community-blogs/b/architectures-and-processors-blog/posts/reduce-tco-with-arm-based-smartnics.

(56) References Cited

OTHER PUBLICATIONS

Turner, Jon, et al., "Supercharging PlanetLab—High Performance, Multi-Application Overlay Network Platform," SIGCOMM-07, Aug. 27-31, 2007, 12 pages, ACM, Koyoto, Japan.
PCT International Search Report and Written Opinion of Commonly Owned International Patent Application PCT/US2022/039016, dated Dec. 19, 2022, 17 pages, International Searching Authority (EPO).
Angeles, Sara, "Cloud vs. Data Center: What's the difference?" Nov. 23, 2018, 1 page, retrieved from https://www.businessnewsdaily.com/4982-cloud-vs-data-center.html.
Author Unknown, "Middlebox," Wikipedia, Nov. 19, 2019, 1 page, Wikipedia.com.
Doyle, Lee, "An Introduction to smart NICs and their Benefits," Jul. 2019, 2 pages, retrieved from https://www.techtarget.com/searchnetworking/tip/An-introduction-to-smart-NICs-and-ther-benefits.
Non-Published Commonly Owned Related International Patent Application PCT/US2022/039016 with similar specification, filed Aug. 1, 2022, 62 pages, VMware, Inc.
Author Unknown, "CISCO Identity-Based Firewall Security," Month Unknown 2011, 2 pages, CISCO Systems, Inc.
Author Unknown, "Hypervisor," Aug. 13, 2020, 1 page, VMware.com.
Author Unknown, "Transparent," Free On-Line Dictionary of Computing (FOLDOC), Jun. 6, 1996, 1 page, retrieved from http://foldoc.org/transparent.
Author Unknown, "AppLogic Features," Jul. 2007, 2 pages, 3TERA, Inc.
Author Unknown, "Enabling Service Chaining on Cisco Nexus 1000V Series," Month Unknown, 2012, 25 pages, CISCO.
Author Unknown, "Next-Generation Firewalls," Month Unknown 2013, 1 page, Palo Alto Networks.
Basak, Debashis, et al., "Virtualizing Networking and Security in the Cloud," Month Unknown 2010, 9 pages, VMware, Inc., Palo Alto, CA.
Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al., (U.S. Appl. No. 61/514,990), filed Aug. 4, 2011, 31 pages.
Guichard, J., et al., "Network Service Chaining Problem Statement," Network Working Group, Jun. 13, 2013, 14 pages, Cisco Systems, Inc.
Ioannidis, Sotiris, et al., "Implementing a Distributed Firewall," CCS '00, Month Unknown 2000, 10 pages, ACM, Athens, Greece.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Li, Junnan, et al., "DrawerPipe: A Reconfigurable Pipeline for Network Processing on FGPA-Based SmartNIC," Electronics 2020, Dec. 10, 2019, 24 pages, retrieved from https://www.mdpi.com/2079-9292/9/1/59.
Litvak, Michail, "Linux—IP-RULE(8): Routing Policy Database Management," Apr. 10, 2014, 5 pages, retrieved from https://man7.org/linux/man-pages/man8/ip-rule.8.html.
Mohammadkhan, Ali, et al., "P4NFV: P4 Enabled NFV Systems with SmartNICs," 2019 IEEE Conference on Network Function Virtualization and Software Defined Networks (NFV-SDN), Nov. 12-14, 2019, 7 pages, IEEE, Dallas, TX, USA.
Non-Published Commonly Owned U.S. Appl. No. 18/196,844, filed May 12, 2023, 41 pages, Nicira, Inc.
Non-Published Commonly Owned U.S. Appl. No. 18/226,775, filed Jul. 27, 2023, 63 pages, Nicira, Inc.
Olds, Dan, "OS Virtualization vs. Hypervisor: Why You Should Offer Both," Oct. 19, 2008, 3 pages, techtarget.com.
Pagiamtzis, Kostas, et al., "Content-Addressable Memory (CAM) Circuits and Architectures: A Tutorial and Survey," IEEE Journal of Solid-State Circuits, Mar. 2006, 16 pages, vol. 41, No. 3.
Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Stojanovski, Nenad, et al., "Analysis of Identity Based Firewall Systems," Jun. 2010, 9 pages.
Stojanovski, Nenad, et al., "Architecture Of A Identity Based Firewall System," Jul. 2011, 9 pages.

\* cited by examiner

STATE SHARING BETWEEN SMART NICs

BACKGROUND

More operations normally associated with a host computer are being pushed to programmable smart network interface controllers (NICs). Some of the operations pushed to these smart NICs include virtual network processing of data messages for compute machines. In some cases, a host computer will have multiple such smart NICs performing network processing or other operations. It is desirable to enable these smart NICs to work together despite performing operations that were previously performed on the host computer (e.g., by a hypervisor of the host computer).

BRIEF SUMMARY

Some embodiments provide methods for enabling multiple smart NICs of the same host computer operate as a single entity (e.g., as a teamed set of smart NICs). In some embodiments, the smart NICs each execute a smart NIC operating system that performs virtual networking operations (and/or other operations, such as virtual storage operations) for a set of data compute nodes (e.g., virtual machines (VMs), containers, etc.) executing on the host computer. In some embodiments, the smart NICs are connected by a private communication channel in order to share dynamic state information, share configuration data (so that one of the smart NICs can act as a single point of contact for a network management and control system), and/or pass between each other data messages sent to and from the data compute nodes (DCNs) that require virtual network processing.

By executing a smart NIC operating system, the smart NICs are able to perform various tasks that would otherwise be performed by the host computer software (e.g., the hypervisor of the host computer). These tasks can include virtual network processing for data messages (i.e., performing virtual switching and/or routing, firewall operations, etc.), virtual storage operations, etc. In order for multiple smart NICs to perform these operations that would otherwise be performed entirely by a single entity (e.g., the hypervisor), communication may be required between the smart NICs.

As mentioned, in some embodiments, a private communication channel is setup between the smart NICs to enable communication between the smart NICs. The private communication channel, in some embodiments, is a physically separate channel. For instance, in some embodiments the smart NICs are connected via a set of physical cables that only carries communication between the smart NICs. In different such embodiments, the smart NICs may be connected serially (so that each smart NIC is directly connected to two other smart NICs, except the smart NICs on the end of the connection which are only connected to one other smart NIC), in a loop (similar to the serial connection, but with all smart NICs connected to two other smart NICs), or via a separate physical switch so that each smart NIC can directly communicate with any other smart NIC through the physical switch. The cables may connect to Ethernet ports of the smart NICs if there are enough ports available (thereby occupying these ports so that networking traffic for the host computer does not use these ports) or to management ports of the smart NICs (which are often lower-bandwidth ports). In some embodiments, the smart NICs use a separate purpose-built channel that is designed for connecting the smart NICs to each other rather than occupying ports that could be used for other purposes.

In other embodiments, the smart NICs communicate via a logically private communication channel that uses existing physical connections. For instance, if all of the smart NICs connect to the same data link layer (layer 2) network, then a dedicated virtual local area network (VLAN) may be used as a private communication channel for the smart NICs. However, if this existing layer 2 network has numerous other host computers with their own sets of smart NICs that require separate VLANs and also carries data messages for the DCNs on the host computer, then the maximum number of VLANs may be reached. Some embodiments instead use an overlay network based on encapsulation (e.g., virtual extensible LAN (VXLAN) or Generic Network Virtualization Encapsulation (Geneve)) as a logically private communication channel. Such overlay networks are not as constrained in number as VLANs and also have the benefit of enabling the smart NICs to communicate across multiple layer 2 networks if necessary (i.e., so long as the smart NICs are all on the same layer 3 network).

In still other embodiments, the smart NICs of a host computer communicate via a private communication channel through that host computer. For instance, smart NICs typically connect to the Peripheral Component Interconnect Express (PCIe) subsystem of the host computer, which can be used for the private communication channel. In different embodiments, the smart NICs use the standard peer-to-peer transfer feature of PCIe, leverage the PCIe switching fabric, or use other enhancements on top of PCIe (e.g., Compute Express Link (CXL)).

As mentioned, one use of the private communication channel is for a first smart NIC to pass a data message (e.g., a data message sent to or from the host computer or a DCN executing on the host computer) to a second smart NIC. The smart NICs operate as a single entity in that their smart NIC operating systems collectively implement a set of virtual networking operations (e.g., implementation of logical switches and/or routers, firewalls, etc.). However, each smart NIC has its own interfaces to which the DCNs of the host computer are bound (e.g., physical functions and virtual functions) as well as its own physical network ports.

As such, a first smart NIC will receive data messages from the DCNs bound to ports of that smart NIC. If the smart NICs collectively implement the virtual networking operations, then this first smart NIC processes these data messages. However, based on this processing, the data message may need to be transmitted to a second smart NIC via the private communication channel so that the second smart NIC can output the data message. For instance, if the destination is another DCN on the host computer bound to the second smart NIC, then the first smart NIC will need to pass the data message to the second smart NIC so that the data message can be output via the correct interface. In addition, if all of the ports of the smart NICs are teamed in a link aggregation group (LAG), then the connections for a single DCN are load balanced across these ports, so some of the data messages sent to the first smart NIC from a particular DCN bound to an interface of the first smart NIC will be output to the physical network via the other smart NICs. Conversely, a data message received at a physical network port of the first smart NIC will be processed by the first smart NIC but might need to be sent to a second smart NIC for delivery to a destination DCN bound to that second smart NIC. In another case, if all of the physical network ports of the first smart NIC have gone down, but the smart NIC itself is still operable, then that smart NIC can still perform the virtual networking operations on data messages but will need to send those to other smart NICs for output to the physical network irrespective of whether the ports operate in a LAG.

In many situations, the smart NICs receive configuration data for the virtual networking operations from a network management and control system. Each of the smart NICs has its own set of ports (possibly including a management port) with their own network addresses, but many network management and control systems treat each host computer as a single entity (e.g., communicating with an agent in the hypervisor for host computers that do not use smart NICs for network virtualization operations). The network management and control system uses a single management network address for each host computer and thus should not directly communicate with all of the multiple smart NICs of a host computer.

In some embodiments, the smart NICs use clustering technology in order to appear to the network management and control system as a single entity for the host computer. For instance, in some embodiments, the smart NICs of a host computer perform a leader election to determine a single one of the smart NICs that communicates with the network management and control system. In some such embodiments, each of the smart NIC operating systems runs a deterministic algorithm that selects one of the smart NICs as the point of contact. Any messages needed for this leader election are communicated over the private communication channel.

The elected smart NIC receives configuration data (e.g., logical switch and logical router configuration data) from the network management and control system and distributes this data to the other smart NICs via the private communication channel so that all of the smart NICs can perform virtual networking operations on data messages sent to and from the DCNs executing on the host computer. In some embodiments, the network management and control system includes both a management plane (MP) and central control plane (CCP), which perform different functions and provide different configuration data to the host computers (in addition to receiving different data from the host computers). In some cases, the smart NICs elect two different leaders, one for communication with the MP and one for communication with the CCP.

In addition to disseminating the configuration data from the network management and control system, the leader smart NIC receives information from the other smart NICs via the private communication channel, some of which is reported to the network management and control system. This information can include runtime statistics (e.g., data message processing statistics), status information, etc., and may be used by the network management and control system and/or the leader smart NIC for monitoring of the host computer and/or smart NICs. The network management and control system may also use this information to modify the virtual networking configuration for the smart NICs.

For various purposes, the smart NICs also use the private communication channel to synchronize dynamic state information in some embodiments. For instance, the monitoring data retrieved by the elected leader smart NIC may be synchronized to at least one backup smart NIC in case of failure of the leader smart NIC. In addition, when performing virtual networking processing, the smart NICs may need to store dynamic state information and share that data with each other. In many situations, the smart NIC operating system stores connection tracking information that indicates open connections and congestion windows for each open connection. This connection tracking information is used by firewall operations to determine whether to allow or drop/block data messages. If a smart NIC becomes inoperable and has not shared any state with the other smart NICs, then all of the connections managed by that smart NIC will be transferred to the other smart NICs, which will not have any record of them. As such, the smart NICs share this connection tracking state information with each other so that failover between the smart NICs can be handled seamlessly.

This sort of state sharing may also be used by smart NICs that are performing operations other than virtual networking (or that perform multiple types of operations for which state sharing is used). If storage virtualization operations are handled by the smart NICs, then in some embodiments the storage virtualization functions include running a network stack to manage a layer 4 connection to the storage. In this case, connection information should again be shared between smart NICs in case of failover, so that these connections are not reset if one of the smart NICs fails.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide methods for enabling multiple smart NICs of the same host computer operate as a single entity (e.g., as a teamed set of smart NICs). In some embodiments, the smart NICs each execute a smart NIC operating system that performs virtual networking operations (and/or other operations, such as virtual storage operations) for a set of data compute nodes (e.g., virtual machines (VMs), containers, etc.) executing on the host computer. In some embodiments, the smart NICs are connected by a private communication channel in order to share dynamic state information, share configuration data (so that one of the smart NICs can act as a single point of contact for a network management and control system), and/or pass between each other data messages sent to and from the data compute nodes (DCNs) that require virtual network processing.

By executing a smart NIC operating system, the smart NICs are able to perform various tasks that would otherwise be performed by the host computer software (e.g., the hypervisor of the host computer). These tasks can include virtual network processing for data messages (i.e., performing virtual switching and/or routing, firewall operations, etc.), virtual storage operations, etc. In order for multiple smart NICs to perform these operations that would otherwise be performed entirely by a single entity (e.g., the hypervisor), communication may be required between the smart NICs.

Figure 1:
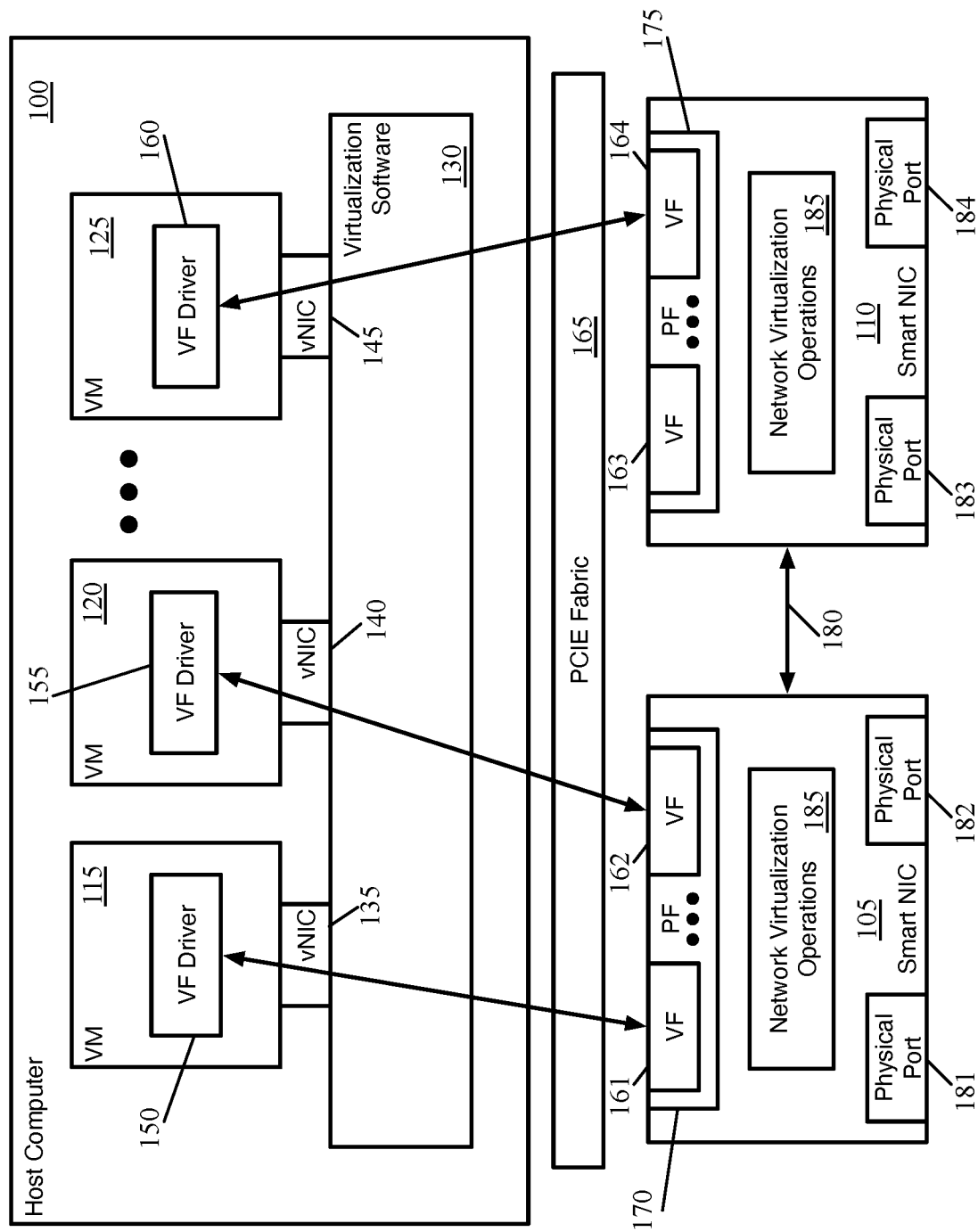
FIG. 1 conceptually illustrates a host computer with multiple physical smart NICs that perform network virtualization operations.

FIG. 1 conceptually illustrates a host computer 100 with multiple physical smart NICs 105 and 110 that perform network virtualization operations. As shown, the host computer 100 includes multiple DCNs (in this case, virtual machines) 115-125 that connect to the smart NICs 105 and 110 in a passthrough mode (i.e., without having any sort of network virtualization processing applied within the virtualization software 130 of the host computer 100). Each of the VMs 115-125 has an associated virtual NIC (vNIC) 135-145 that connects to a different virtual function (VF) 161-164 of one of the smart NICs 105 and 110 via a Peripheral Component Interconnect Express (PCIe) fabric 165 (a motherboard-level interconnect that connects the physical processor of the host computer 100 to the physical interfaces of the smart NICs 105 and 110).

Each vNIC 135-145, and thus each VM 115-125, is bound to a different VF of one of the smart NICs 105 or 110. The VFs 161-164, in some embodiments, are virtualized PCIe functions exposed as interfaces of the smart NICs. Each VF is associated with a physical function (PF), which is a physical interface of the smart NIC that is recognized as a unique PCIe resource. In this case, the smart NIC 105 has one PF 170 and the smart NIC 110 has one PF 175, but in many cases each smart NIC will have more than one PF. The PF 170 is virtualized to provide at least the VFs 161-162 while the PF 175 is virtualized to provide at least the VFs 163-164.

In some embodiments, the VFs are provided so as to provide different VMs with different virtual interfaces of the smart NICs to which they can each connect. In some embodiments, VF drivers 150-160 execute in each of the VMs 115-125 to manage their respective connections to the VFs. As shown, in some embodiments, each VM 115-125 is associated with a vNIC 135-145 that is provided by the virtualization software 130 as a software emulation of the NIC. In different embodiments, the VMs 115-125 access the VFs either through their respective vNICs 135-145 or directly in a passthrough mode (in which the virtualization software 130 is not involved in most network communications. In yet other embodiments, the VMs 115-125 can switch between this passthrough mode and accessing the VFs via their respective vNICs 135-145. In either case, the virtualization software 130 is involved in allocating the VFs 161-164 to the VMs 115-125 and enabling the VFs to be accessible from the VF drivers 150-160.

It should also be noted that although in this case all of the network virtualization operations have been shifted from the virtualization software 130 of the host computer to the smart NICs 105 and 110, in other embodiments virtual switch(es) provided by the virtualization software 130 can connect directly to the PFs 170 and 175. In some such embodiments, data traffic is sent from a VM via a vNIC to the virtual switch, which provides the traffic to the PF. In this case, the virtual switch performs basic switching operations but leaves the network virtualization operations to the smart NIC.

The smart NICs 105 and 110 also include physical network ports 181-184. In different embodiments, smart NICs may each include only a single physical network port or multiple (e.g., 2, 3, 4, etc.) physical network ports. These physical network ports 181-184 provide the physical communication to a datacenter network for the host computer 100. In addition, a private communication channel 180 is shown between the two smart NICs 105 and 110, which allows these smart NICs to communicate. As described further below, this communication channel 180 may take various forms (e.g., direct physical connection, logical connection via the existing network, connection via PCIe messages).

Finally, FIG. 1 illustrates that the smart NICs 105 and 110 perform network virtualization operations 185. In some embodiments, these operations can include logical switching and/or routing operations, distributed firewall operations, encapsulation, and other networking operations that are often performed in the virtualization software of host computers. In some embodiments, all of the smart NICs of a given host computer are provided with the same virtual networking configuration.

Though not shown in the figure, in some embodiments each smart NIC is a NIC that includes (i) a packet processing circuit, such as an application specific integrated circuit (ASIC), (ii) a general-purpose central processing unit (CPU), and (iii) memory. The packet processing circuit, in some embodiments, is an I/O ASIC that handles the processing of data messages forwarded to and from the DCNs in the host computer and is at least partly controlled by the CPU. In other embodiments, the packet processing circuit is a field-programmable gate array (FPGA) configured to perform packet processing operations or a firmware-programmable processing core specialized for network processing (which differs from the general-purpose CPU in that the processing core is specialized and thus more efficient at packet processing). The CPU executes a NIC operating system in some embodiments that controls the packet processing circuit and can run other programs. In some embodiments, the CPU configures the packet processing circuit to implement the network virtualization operations by configuring flow entries that the packet processing circuit uses to process data messages.

When a data message is sent by one of the VMs 115-125, that data message is (in software of the host computer 100) sent via the corresponding vNIC 135-145. The data message is passed through the PCIe bus 165 to the corresponding VF 161-164 of the appropriate smart NIC. The smart NIC ASIC processes the data message to apply the configured network virtualization operations 185, then (so long as the data message does not need to be sent to the other smart NIC of the host computer and the destination for the data message is external to the host computer) sends the data message out of one of its physical ports 181-184.

It should be noted that, while FIG. 1 illustrates a host computer with virtualization software on which various VMs operate, the discussion of smart NICs herein also applies to host computers hosting other types of virtualized DCNs (e.g., containers) as well as bare metal computing devices (i.e., on which the computer does not execute virtualization software). In the latter case, the bare metal computing device will typically directly access the PFs of multiple smart NICs rather than any VFs. That is, the smart NICs are used to provide network virtualization (or other operations, such as storage virtualization) without the software on the computing device being aware of these operations.

Figure 2:
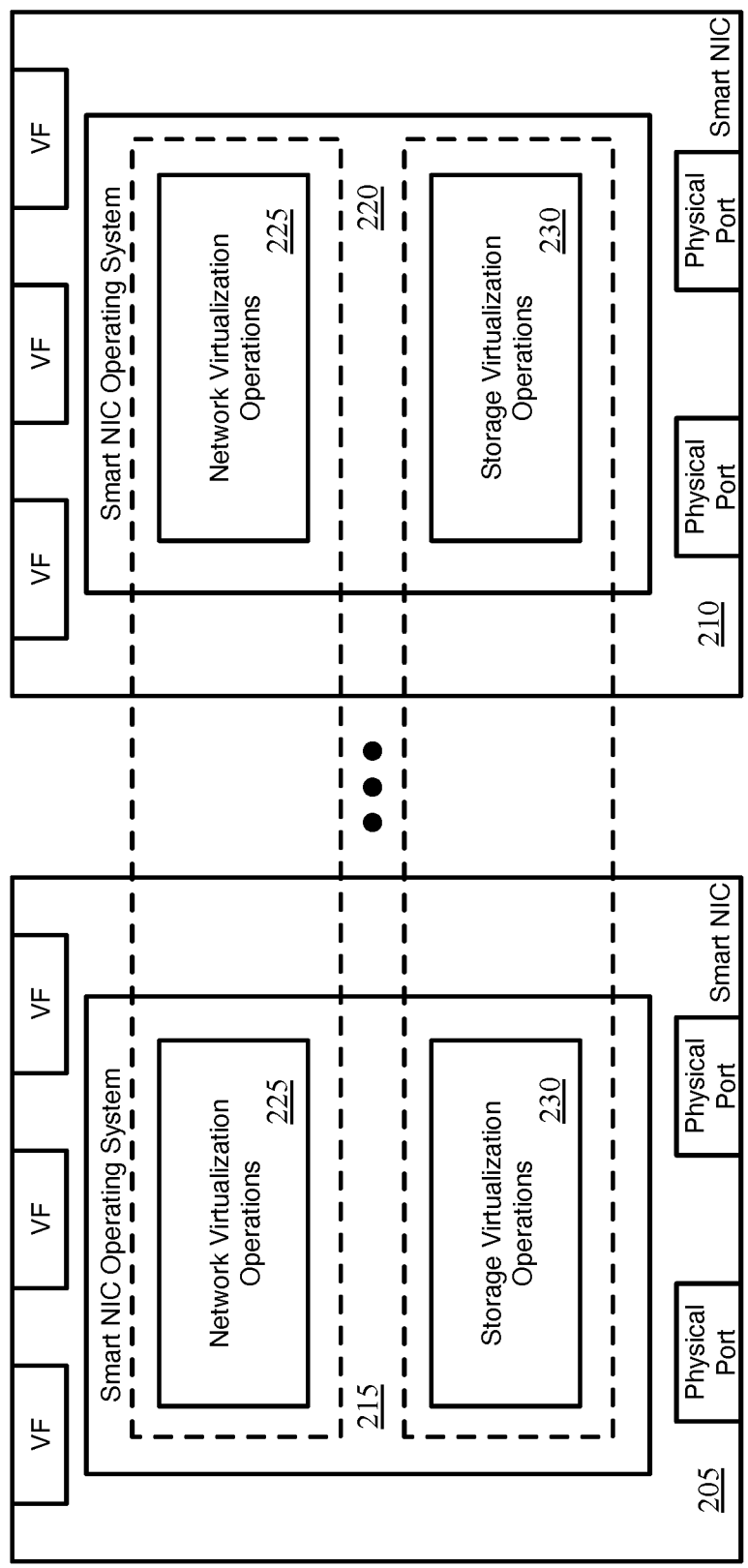
FIG. 2 conceptually illustrates the collective operation of a set of smart NICs of a single host computer of some embodiments.

FIG. 2 conceptually illustrates the collective operation of a set of smart NICs 205-210 of a single host computer of some embodiments. Each of these smart NICs includes multiple VFs for communication with VMs of the host computer as well as multiple physical ports for communication with a datacenter network (e.g., to which other host computers, that may or may not use smart NICs, also connect).

Each of the smart NICs runs (i.e., on the CPU of the respective smart NIC) a smart NIC operating system 215-220. Each smart NIC operating system 215-220 controls the ASIC of the smart NIC and performs additional operations, such as network virtualization operations 225 and storage virtualization operations 230. These operations 225 and 230 (and, in other embodiments, other types of operations) are distributed across the various smart NICs 215-220 of the host computer such that the smart NICs appear to operate as a single entity (i.e., in the same way as the virtualization software of the host computer is a single entity). The network virtualization operations 225, as indicated above, include performing logical switching and/or routing of data messages for one or more logical forwarding elements, applying distributed firewall rules, performing network address translation, and other networking features. If each of the smart NICs 205-210 is configured to perform the same network virtualization operations, then any of the smart NICs can receive a data message directed to or sent from one of the DCNs executing on the host computer and properly process this data message.

Similarly, if the storage virtualization operations 230 are configured across all of the smart NICs, then a VM can be bound to any of the smart NICs and can handle I/O requests from the VM to the virtual storage network. Whereas VMs are bound to smart NIC network adapter VFs for networking operations, the VFs to which the VMs are bound for the purpose of storage virtualization are storage VFs (e.g., non-volatile memory express (NVMe) devices or small computer system interface (SCSI) devices).

In order for multiple smart NICs to perform these operations as though operating as a single entity (similar to a hypervisor of the host computer), communication may be required between the smart NICs. Therefore, in some embodiments, a private communication channel is setup between the smart NICs to enable communication between the smart NICs.

Figure 3:
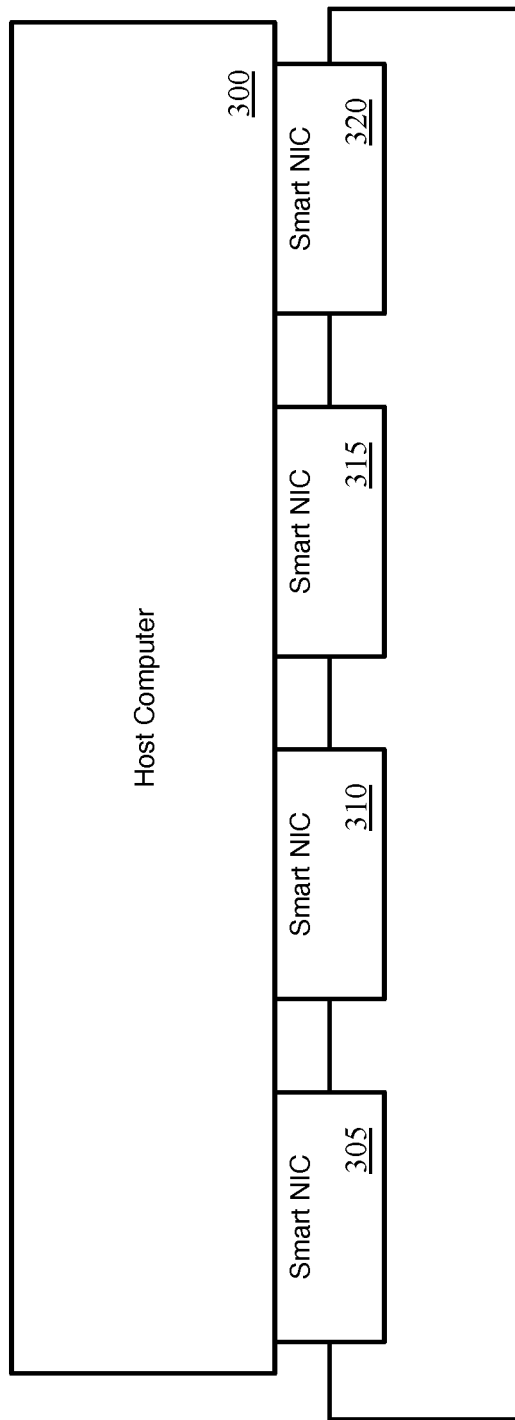
FIG. 3 conceptually illustrates some embodiments in which the smart NICs of a host computer are connected serially.

The private communication channel, in some embodiments, is a physically separate channel. For instance, in some embodiments the smart NICs are connected via a set of physical cables that only carries communication between the smart NICs. FIG. 3 conceptually illustrates some embodiments in which the smart NICs of a host computer 300 are connected serially. As shown, each of the smart NICs 305-320 are connected to two other smart NICs. That is, the smart NIC 305 is connected to smart NICs 320 and 310, the smart NIC 310 is connected to smart NICs 305 and 315, the smart NIC 315 is connected to smart NICs 310 and 320, and therefore the smart NIC 320 is connected to smart NICs 315 and 305. Depending on the physical arrangement of the smart NICs, some embodiments do not directly connect the smart NICs on the end (i.e., in the example the smart NICs 305 and 320 would not be connected).

Having a full ring connection (as shown in FIG. 3) allows for any of the smart NICs 305-320 to communicate with any of the other smart NICs in case of a failure of one of the communication links (or one of the smart NICs themselves). For instance, if the link between smart NIC 310 and smart NIC 315 failed, then smart NIC 310 could still reach smart NIC 315 via the other two smart NICs 305 and 320. Similarly, if the smart NIC 310 itself failed, then smart NIC 305 could still reach smart NIC 315 via smart NIC 320.

Figure 4:
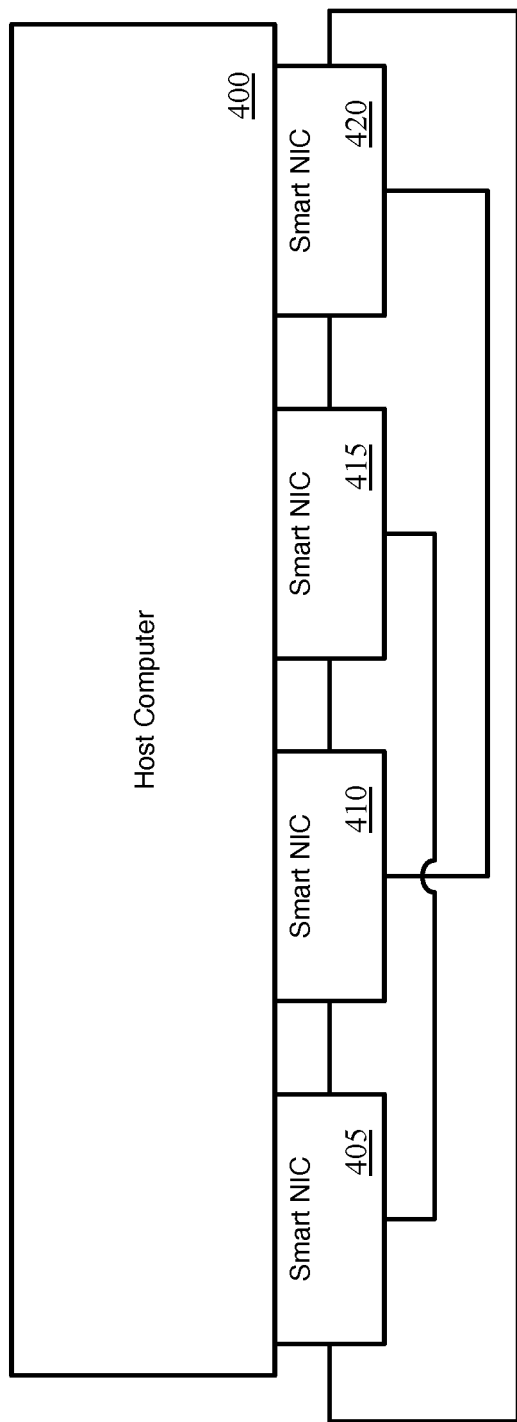
FIG. 4 conceptually illustrates some embodiments in which each smart NIC of a host computer is connected directly to each other smart NIC of the host computer.

For even more robust failure protection, some embodiments include private communication channel links between each pair of smart NICs (i.e., a full mesh of connections). FIG. 4 conceptually illustrates some embodiments in which each smart NIC of a host computer 400 is connected directly to each other smart NIC of the host computer. As shown, each of the smart NICs 405-420 is connected directly to each of the other three smart NICs 405-420. In such a setup, if there are N smart NICs for a host computer, then each smart NIC requires N−1 direct connections to the other smart NICs. This sort of setup is reasonable for a host computer with a reasonably small number of smart NICs (e.g., 3-5 smart NICs), but becomes more difficult for larger numbers.

These connections may use a separate purpose-built channel for inter-NIC communication in some embodiments. In other embodiments, if the smart NICs have enough physical ports, the connections can repurpose the physical network ports of the NICs (e.g., using Ethernet cables—if there are more than two smart NICs, though, this can require two of the network ports). Yet other embodiments use management ports of the smart NICs if these ports are available and if the bandwidth of the management ports is high enough to handle the expected communications between the smart NICs. In some embodiments, the smart NIC components that enable the private communications channel are isolated from the other components of the smart NIC. In this case, even if the other smart NIC components are non-operational (e.g., due to a firmware or software bug, hardware failure, etc.), the smart NIC is still able to at least relay traffic between the smart NICs.

Figure 5:
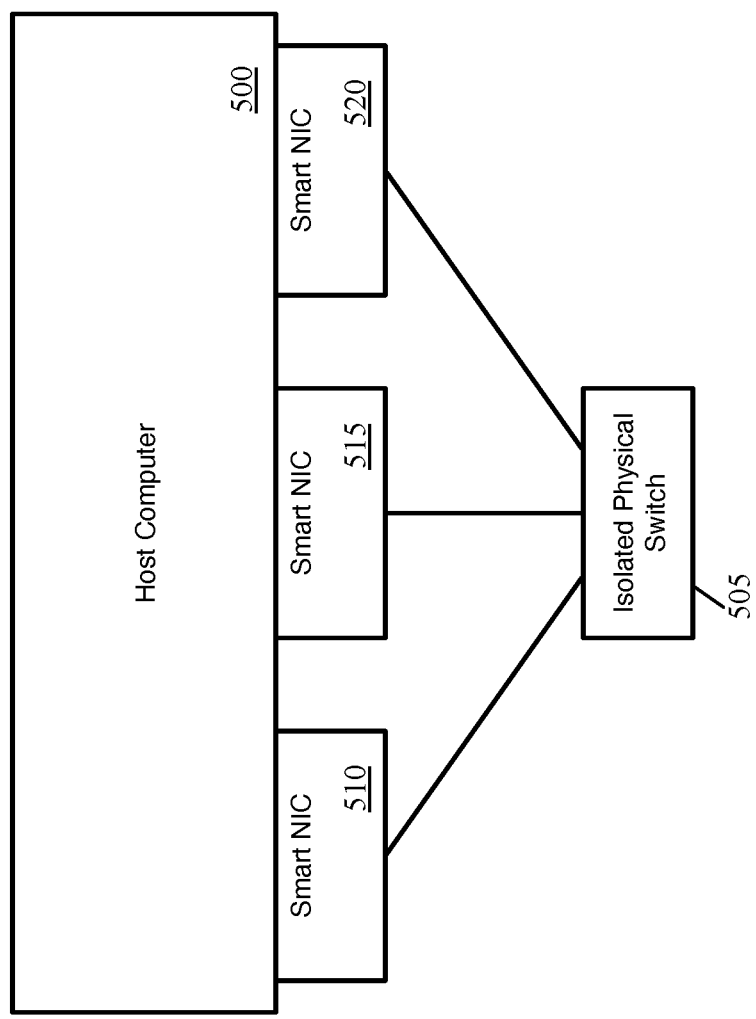
FIG. 5 conceptually illustrates an example of the smart NICs of a host computer connected through a separate physical switch.

Rather than have the smart NICs connected to each other directly (whether serially or in a mesh), in other embodiments these smart NICs connect via a separate physical switch so that each smart NIC can directly communicate with any other smart NIC through the physical switch. FIG. 5 conceptually illustrates an example of the smart NICs of a host computer 500 connected through a separate physical switch 505. As shown, each of the smart NICs 510-520 of the host computer 500 connects to an isolated physical switch 505. This physical switch 505, in some embodiments, only handles inter-smart NIC communication (i.e., it is not part of a datacenter network that handles data messages between DCNs and/or management and control traffic). In fact, this physical switch might not even use the same switching technology (e.g., Ethernet or Infiniband) used to carry networking traffic within the datacenter. As in the previous example, these connections may use a separate purpose-built channel, a physical network port, or a management port. In addition, for redundancy, some embodiments use two separate isolated switches (or more than two), with each smart NIC 510-520 connecting to each of these isolated switches.

Rather than use a separate physical channel for private communications between smart NICs (e.g., if there is no separate purpose-built channel and the network ports cannot be spared for this use), in some embodiments the smart NICs communicate via a logically private communication channel that uses existing physical connections. For instance, all of the smart NICs of a host computer will generally connect to the same physical datacenter network, so a private communication channel can be overlaid on that network.

Figure 6:
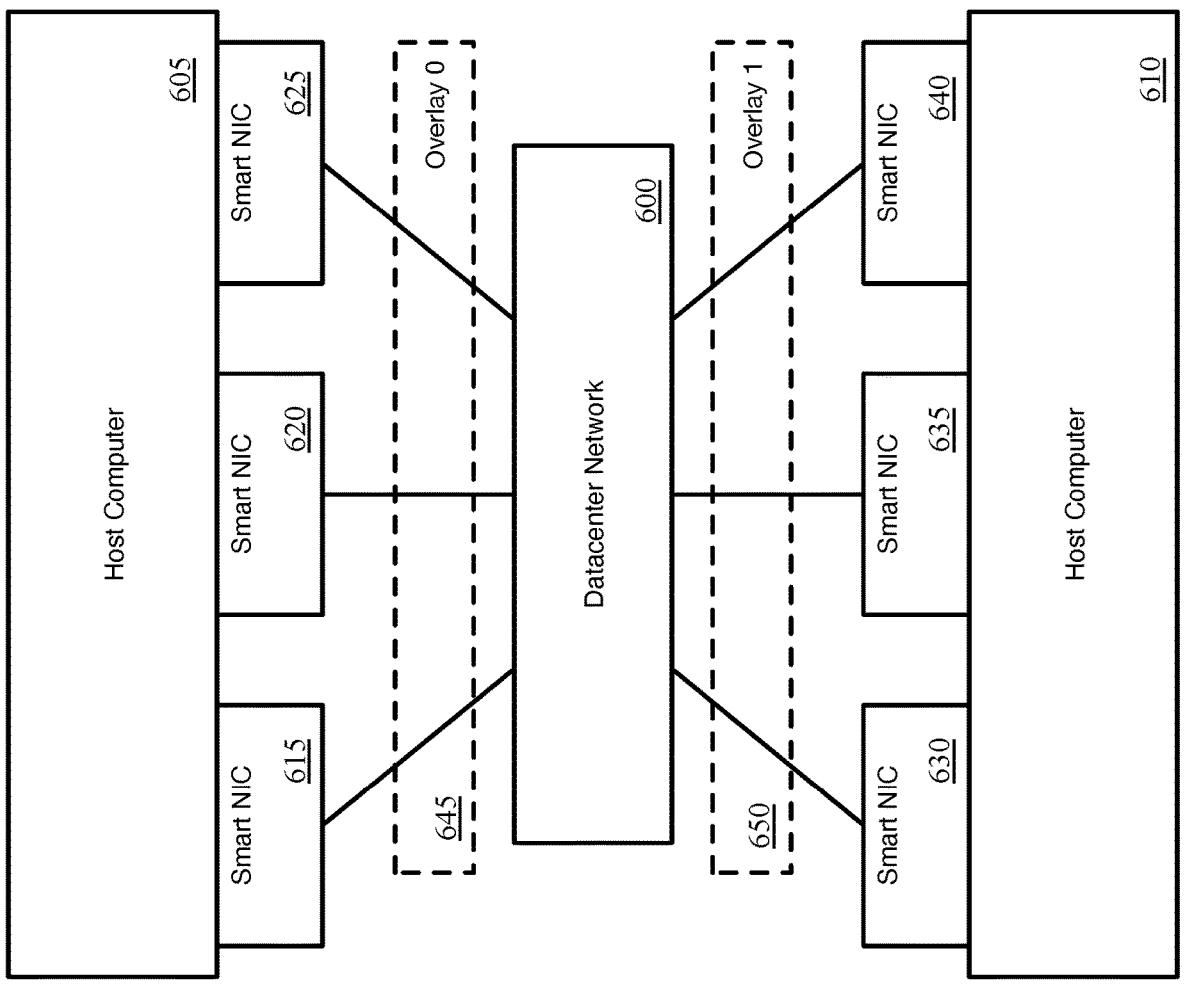
FIG. 6 conceptually illustrates two host computers with three smart NICs each that connect to a datacenter network and use overlays on that datacenter network as their respective private communication channels.

FIG. 6 conceptually illustrates two host computers 605 and 610 with three smart NICs each that connect to a datacenter network 600 and use overlays on that datacenter network as their respective private communication channels. As shown, the first host computer 605 includes three smart NICs 615-625 that connect to the datacenter network 600 while the second host computer 610 also includes three smart NICs 630-640 that connect to the datacenter network 600.

Each of these respective sets of smart NICs uses a different overlay network (e.g., using encapsulation) as a private communication channel. The first set of smart NICs 615-625 uses a first overlay network 645 and the second set of smart NICs 630-640 uses a second overlay network 650. These overlay networks used as private communication channels may be VXLAN networks, Geneve networks, etc. In some embodiments, the encapsulation network addresses used are those associated with the physical network ports of the smart NICs (i.e., the same network addresses used for encapsulating data traffic between DCNs on their respective host computers) while the underlying overlay network addresses are logical addresses associated with the smart NIC operating systems (in fact, the first set of smart NICs 615-625 could use the same set of overlay network addresses as the second set of smart NICs 630-640.

The use of overlay networks requires only that all of the smart NICs of a host computer be attached to the same layer 3 network (but not necessarily the same subnet). Thus, if one of the smart NICs is connected only to a physically separate management network but the others are connected to a data network within a datacenter (and not to the management network), then the smart NICs cannot communicate via such an overlay network. Some other embodiments use a dedicated VLAN as the private communication channel if all of the smart NICs for a host computer connect to the same data link layer (layer 2) network. However, if this existing physical layer 2 network has numerous other host computers with their own sets of smart NICs that require separate VLANs and also carries data messages for the DCNs on these host computers, then the maximum number of VLANs (4094) available on a single network may be reached.

Figure 7:
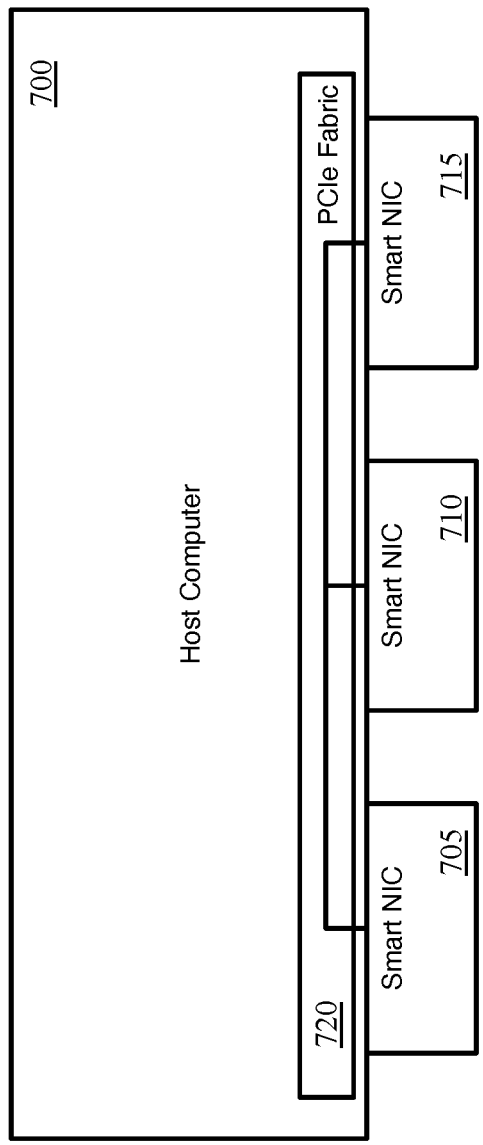
FIG. 7 conceptually illustrates a host computer with three smart NICs that communicate through a PCIe bus of the host computer.

In still other embodiments, the smart NICs of a host computer communicate via a private communication channel through that host computer. As described above, smart NICs typically connect to the PCIe subsystem of the host computer, which can be used for the private communication channel. FIG. 7 conceptually illustrates a host computer 700 with three smart NICs 705-715 that communicate through a PCIe fabric 720 of the host computer. Communicating through the PCIe subsystem typically allows any smart NIC to talk directly to any of the other smart NICs. In different embodiments, the smart NICs use the standard peer-to-peer transfer feature of PCIe, leverage the PCIe switching fabric, or use other enhancements on top of PCIe (e.g., Compute Express Link (CXL)).

As mentioned, one use of the private communication channel is for a first smart NIC to pass a data message (e.g., a data message sent to or from the host computer or a DCN executing on the host computer) to a second smart NIC. The smart NICs operate as a single entity in that their smart NIC operating systems collectively implement a set of virtual networking operations (e.g., implementation of logical switches and/or routers, firewalls, etc.). However, each smart NIC has its own interfaces to which the DCNs of the host computer are bound (e.g., physical functions and virtual functions) as well as its own physical network ports.

Figure 8:
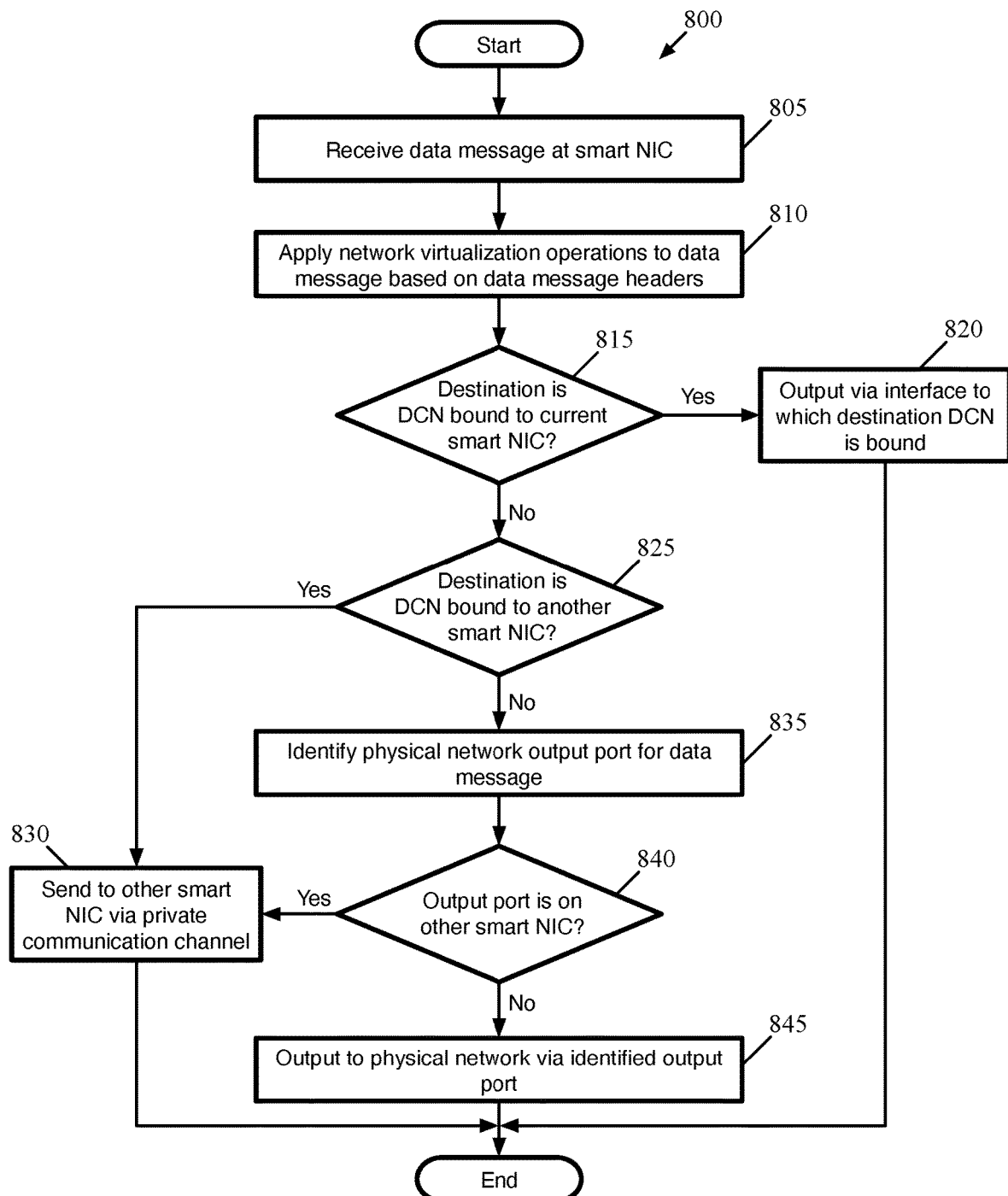
FIG. 8 conceptually illustrates a process of some embodiments for processing a data message at a smart NIC that is one of multiple smart NICs for a host computer.

FIG. 8 conceptually illustrates a process 800 of some embodiments for processing a data message at a smart NIC that is one of multiple smart NICs for a host computer. As described above, each of the smart NICs has one or more interfaces, and DCNs operating on the host computer are each bound to a different interface. In addition, the virtual networking operations performed on the data messages have been pushed into the smart NIC operating system (as opposed to being performed by forwarding elements executing in the hypervisor of the host computer). The process 800 will be described in part by reference to FIGS. 9-11, which illustrate examples of data messages being processed by a smart NIC.

As shown, the process 800 begins by receiving (at 805) a data message at a smart NIC. This data message could have been received from a datacenter network through a physical port of the smart NIC (e.g., as in FIG. 9) or from the host computer (e.g., from a DCN executing on the host computer) through an interface of the smart NIC that binds to the host computer or one or more DCNs on the host computer (e.g., as in FIGS. 10 and 11). It should be understood that the terms data message, packet, data packet, or message are used herein to refer to various formatted collections of bits that may be sent between network endpoints (e.g., between DCNs in a host and/or across a physical network), such as Ethernet frames, IP packets, TCP segments, UDP datagrams, etc. While the examples herein refer to data messages, packets, data packets, or messages, it should be understood that the invention should not be limited to any specific format or type of data message.

The process 800 then applies (at 810) network virtualization operations to the received data message based on the data message headers. These operations, as described, may include logical switching (e.g., based on a logical destination MAC address of the data message), logical routing (e.g., based on a logical destination IP address of the data message), distributed firewall operations (based on, e.g., a connection five-tuple of the data message, including source and destination IP addresses, transport layer protocol, and source and destination transport layer ports), network address translation, encapsulation (if required), and other operations that are commonly performed by hypervisors of the host computer. If the smart NICs collectively implement the virtual networking operations, then the smart NIC that first receives the data message performs this processing. When a first smart NIC receives the data message from a second smart NIC through the private communication channel, the second smart NIC will typically have already performed the required network virtualization operations (or the majority of these operations) and the first smart NIC can determine the destination of the data message with minimal additional processing.

Based on these network virtualization operations, the smart NIC is able to determine a destination for the data message. It should be understood that the process 800 is a conceptual process and does not necessarily reflect the specific operations performed by a smart NIC. For instance, rather than perform a series of determinations regarding whether the destination is of a particular type (i.e., those shown in operations 815, 825, and 840), the smart NIC will typically just identify a matching record (e.g., a flow record) for the data message and perform an action specified by that matching record. It should also be noted that this process does not cover the full spectrum of data message processing options. For instance, in some embodiments the smart NIC may block and/or drop data messages due to firewall rules, congestion, etc.

The process 800 determines (at 815) whether the destination for the data message is a DCN that is bound to the current smart NIC (i.e., the smart NIC performing the process 800). This could be the case for data messages received from external networks or from other DCNs on the host computer (which may be bound to any of the smart NICs). When the destination is such a DCN bound to the current smart NIC, the process outputs (at 820) from the smart NIC via the interface to which the destination DCN is bound. In some embodiments, the data message is then handled by the host computer (e.g., sent to the DCN either via a vNIC or directly to the VF driver executing on the DCN without additional network virtualization processing in the hypervisor of the host computer).

When the destination for the data message is not a DCN bound to the current smart NIC, the process 800 determines (at 825) whether the destination is a DCN bound to a different smart NIC of the host computer. This could be the case for data messages received from external networks or from other DCNs on the host computer that are bound to the current smart NIC. Further, if the private communication channel does not have direct communication between every pair of smart NICs, then a first smart NIC might receive a data message from a second smart NIC and need to send that data message to a third smart NIC (e.g., in the example shown in FIG. 3). When the destination is such a DCN bound to another smart NIC, the process 800 sends (at 830) the data message to that other smart NIC (or an intermediary smart NIC if the NICs are connected serially) via the private communication channel between the smart NICs.

Figure 9:
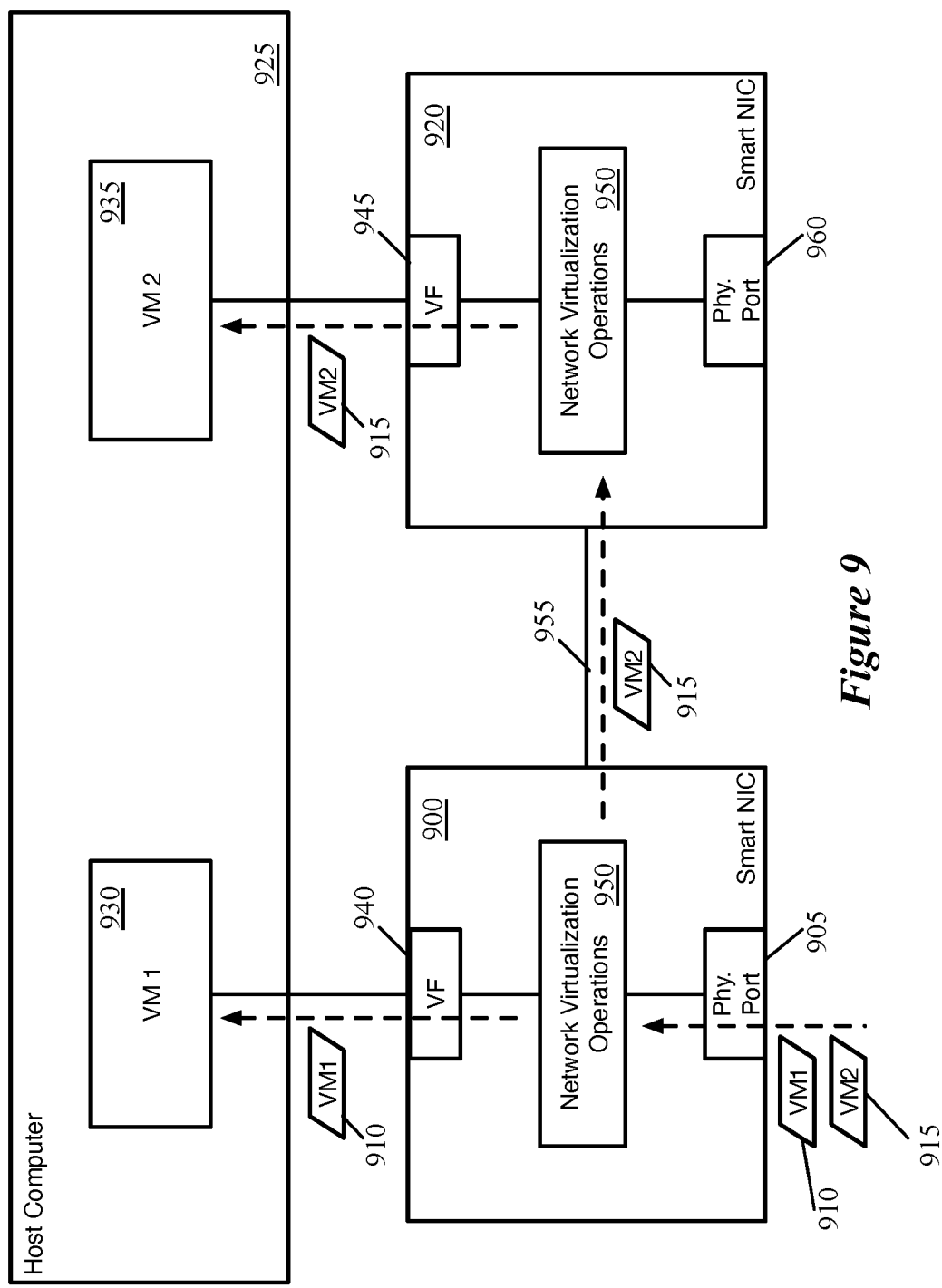
FIG. 9 conceptually illustrates the path of two data messages received at a smart NIC via the physical port of that smart NIC.

FIG. 9 conceptually illustrates the path of two data messages 910 and 915 received at a first smart NIC 900 via the physical port 905 of that smart NIC. In this example, each of the smart NICs 900 and 920 of a host computer 925 have a single physical port each. At least two VMs 930 and 935 execute on the host computer 925, and for simplicity only the VFs bound to these VMs are shown. The first smart NIC 900 provides a VF 940 to which the first VM 930 is bound (e.g., via its vNIC, which is not shown) while the second smart NIC 920 provides a VF 945 to which the second VM 935 is bound (also via its vNIC). Each of the smart NICs 900 and 920 performs network virtualization operations 950, and a private communication channel 955 connects the two smart NICs. This private communication channel may be any of the types described above (e.g., a separate physical channel, a VLAN or overlay network on the physical network to which the physical ports 905 and 960 of the smart NICs connect, or a connection through the PCIe subsystem).

The smart NIC 900 performs network virtualization operations 950 on each of the data messages 910 and 915. Because the destination address for the first data message 910 is that of VM1 930 which is bound to that smart NIC 900, the smart NIC 900 outputs the data message 910 via VF 940 to the VM 930. On the other hand, the network virtualization operations 950 applied to the second data message 915 identify that the destination address for this data message 915 is that of VM2 935, which is bound to the second smart NIC 920. As such, the first smart NIC 900 passes this data message 915 to the second smart NIC 920 via the private communication channel 955. In some embodiments, the first smart NIC 900 also provides context information to the second smart NIC 920 regarding processing of the data message by the network virtualization operations 950, so that this processing does not need to be fully repeated at the second smart NIC 920. The second smart NIC 920, in some embodiments, applies network virtualization operations 950 to evaluate this context and determine that the data message 915 should be sent to the VM2 935. As such, the smart NIC 920 outputs the data message 915 via VF 945 to the VM 935.

Returning to FIG. 8, if the destination for the data message is not a DCN on the host computer, then (assuming the data message is not to be dropped or blocked) the destination is external to the host computer. As such, the process 800 identifies (at 835) the physical network output port for the data message. In some cases, all of the ports of all of the smart NICs are teamed in a link aggregation group (LAG) or other teaming mechanism. In this case, the connections for a single DCN bound to a particular smart NIC are load balanced across all of the physical output ports of all of the smart NICs and not just output by the smart NIC that receives the data message. In other cases, the different smart NIC ports might have different connectivity such that data messages for certain destinations need to be output from one smart NIC and data messages for other destinations need to be output from another smart NIC (irrespective of any load balancing operations).

As such, the process 800 determines (at 840) whether the identified physical network output port is on another smart NIC or the current smart NIC. If the output port for the data message is a port of another smart NIC, then the process 800 sends (at 830) the data message to the other smart NIC (or an intermediary smart NIC if the NICs are connected serially) via the private communication channel between the smart NICs. On the other hand, if the identified output port is a port of the current smart NIC, then the process 800 outputs (at 845) the data message to the physical network via the identified output port. After outputting the data message to either a DCN (via an interface of the current smart NIC), the physical network, or another smart NIC via the private communication channel, the process 800 ends.

Figure 10:
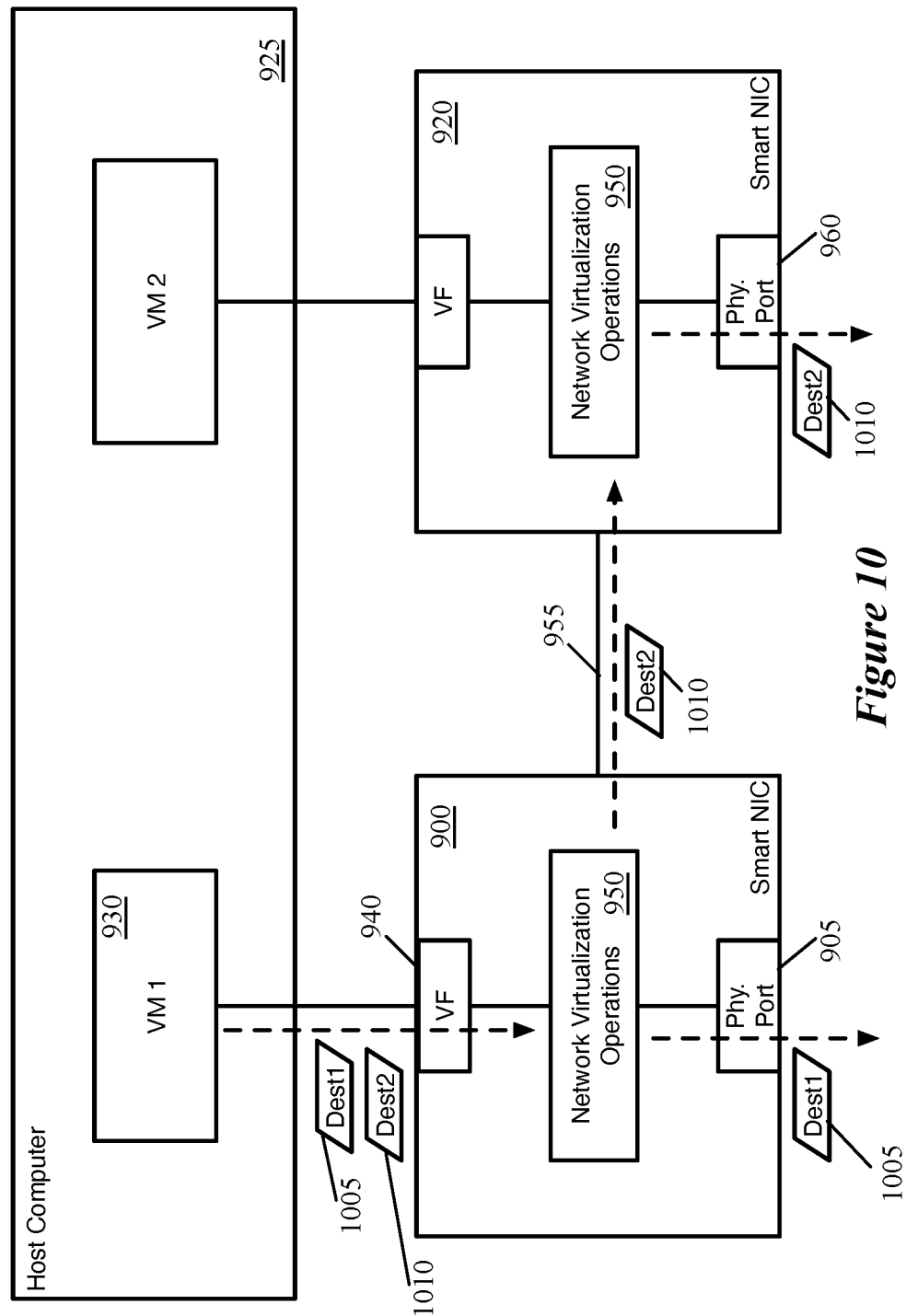
FIG. 10 conceptually illustrates the path of two data messages received at a smart NIC from a VM via the VF to which that VM is bound.

FIG. 10 conceptually illustrates the path of two data messages 1005 and 1010 received at the first smart NIC 900 from the first VM 930 via the VF 940 to which that VM is bound. As shown, the first data message 1005 is directed to a first destination (Dest1) while the second data message 1010 is directed to a second destination (Dest2). The smart NIC 900 processes both of these data messages according to the configured network virtualization operations 950, which in this case (i) determines that both data messages should be output to the physical network and (ii) includes load balancing across multiple output ports (e.g., in a LAG). In some embodiments, only the first data message in a connection has the load balancing operations applied, while for subsequent operations a cached result directs the data message to the same physical output port.

Based on these operations, the smart NIC 900 outputs the first data message 1005 to the physical network via its own physical port 905. The second data message 1010, however, is sent to the second smart NIC 920 via the private communication channel 955. In some embodiments, the first smart NIC 900 also provides context information indicating that network virtualization operations have been performed on the data message 1010 and that it should be output via the physical port 960 of the second smart NIC 920. The second smart NIC 920 receives the second data message 1010 via the private communication channel 955 and outputs this data message 1010 to the physical network via its physical port 960.

As described above by reference to FIG. 8, the private communication channel is also used when a DCN bound to an interface of one smart NIC sends a data message to a DCN bound to an interface of another smart NIC. Rather than the first smart NIC outputting the data message onto the physical network to be switched and/or routed back to the host computer via the second smart NIC, the private communication channel allows for the data message to be sent directly between the smart NICs.

Figure 11:
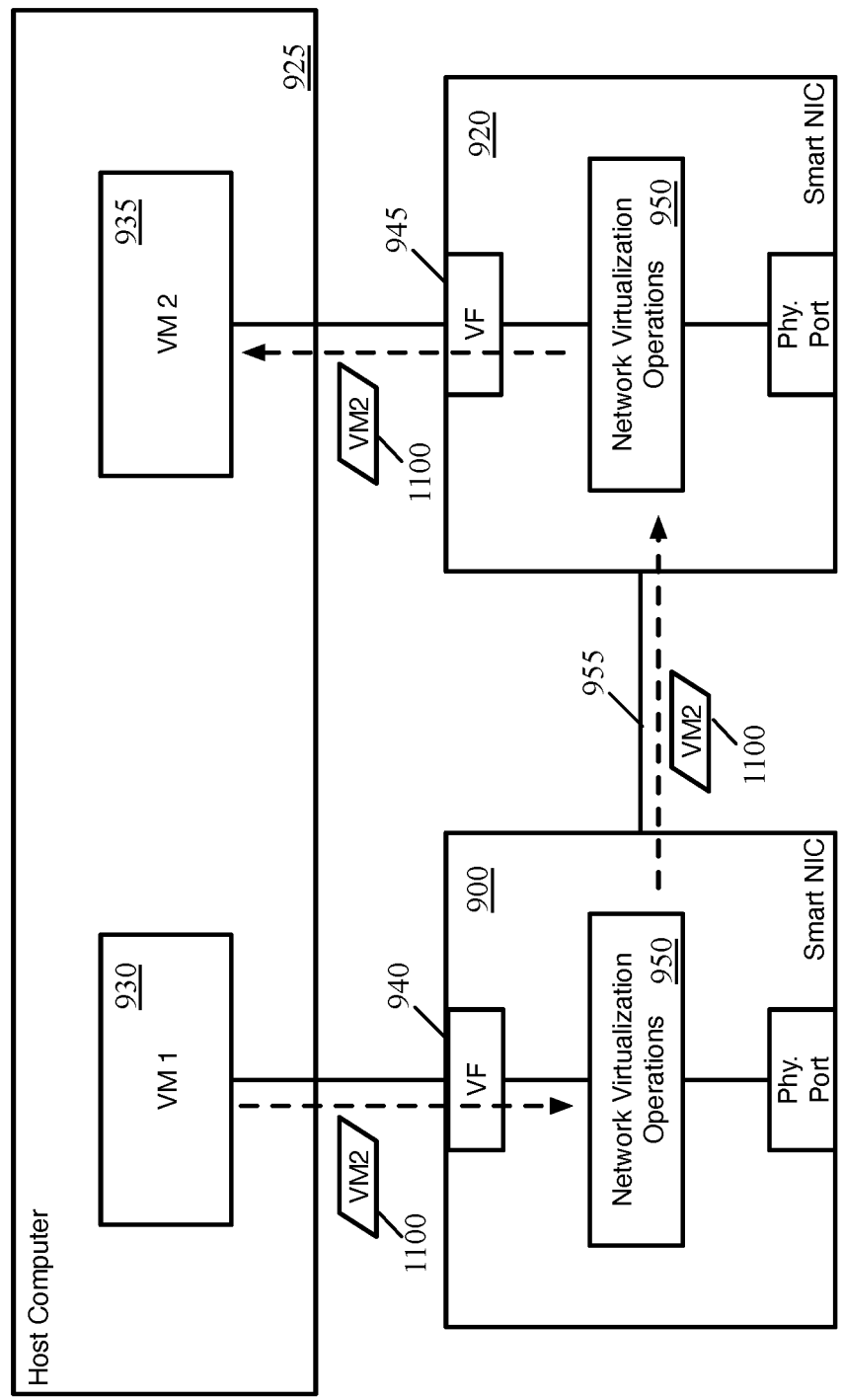
FIG. 11 conceptually illustrates the path of a data message sent from a first VM operating on a host computer to a second VM.

FIG. 11 conceptually illustrates the path of a data message 1100 sent from the first VM 930 operating on the host computer 925 to the second VM 935. Here, the first smart NIC 900 receives the data message 1100 via the VF 940 to which the source VM 930 is bound. The smart NIC 900 applies network virtualization operations 950 to the data message 1100 to determine that the destination of the data message is a VM bound to the second smart NIC 920. Based on this determination, the smart NIC 900 sends the data message 1100 to the second smart NIC 920 via the private communication channel 955 between the smart NICs. As in the other examples, in some embodiments the first smart NIC 900 also provides context information indicating that network virtualization operations have been performed on the data message 1100 and that the data message is directed to a DCN bound to the smart NIC 920 (though without necessarily indicating to which interface the DCN is bound). The second smart NIC 920 receives the data message 1100 via the private communication channel 955 and outputs the data message to the VM 935 via the VF interface 945.

The above-described process 800 as well as the examples shown in FIGS. 9-11 relate to unicast data messages (i.e., data messages with a single destination). In some embodiments, a single data message (e.g., a broadcast or multicast data message) might be sent along multiple paths by the network virtualization operations performed within one smart NIC.

Figure 12:
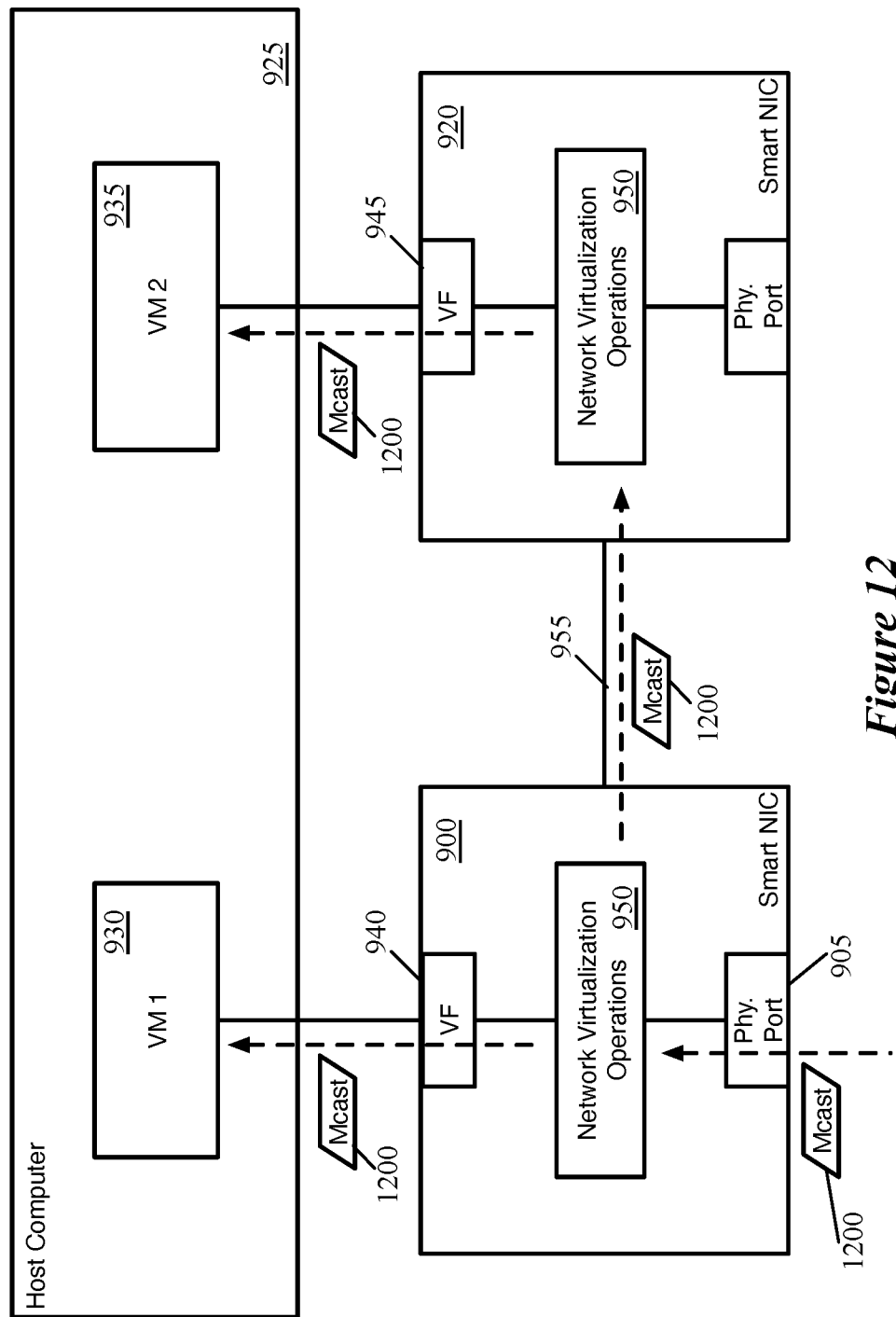
FIG. 12 conceptually illustrates the paths of a multicast data message received at a first smart NIC of a host computer via a physical port of that smart NIC.

FIG. 12 conceptually illustrates the paths of a multicast data message 1200 received at the first smart NIC 900 via the physical port 905 of that smart NIC. In this example, the first smart NIC 900 applies network virtualization operations 950 to the multicast data message 1200 and determines that both the first VM 930 and the second VM 935 are in the multicast group to which the data message 1200 is sent. Based on this, the smart NIC 900 (i) outputs a first copy of the multicast data message 1200 via the VF 940 to the first VM 930 and (ii) passes a second copy of the data message 1200 to the second smart NIC 920 via the private communication channel 955. In some embodiments, the first smart NIC 900 also provides context information to the second smart NIC 920 regarding processing of the data message by the network virtualization operations 950, so that this processing does not need to be fully repeated at the second smart NIC 920. The second smart NIC 920, in some embodiments, applies network virtualization operations 950 to evaluate this context and determine that the multicast data message 1200 should be sent to the second VM 935. As such, the smart NIC 920 outputs the data message 1200 via VF 945 to the VM 935. In some embodiments, if multiple destinations of a multicast data message are bound to the second smart NIC 920, only one copy of the data message is passed via the communication channel 955, allowing the second smart NIC 920 to generate and output the necessary copies of the data message. Similarly, if one of the VMs attached to a first smart NIC sends a broadcast or multicast data message, the recipient smart NIC may process the data message and generate any copies necessary to send the data message to other VMs attached to the first smart NIC, output the data message via its physical port(s), and/or pass the data message to other smart NICs (either to send the data message to VMs bound to those smart NICs, output the data message via their physical port(s), or a combination thereof).

Another situation that can require the use of the private communication channel for passing a data message between smart NICs occurs if all of the physical network ports of a smart NIC have become inoperable but the smart NIC itself is still operable. In this case, the smart NIC may still perform virtual networking operations on data messages sent from the DCNs bound to that smart NIC but will need to send those data messages to other smart NICs for output to the physical network irrespective of whether the ports operate in a LAG or not. When the ports do operate in a LAG or the smart NICs are configured in a NIC team using another teaming mechanism, connections that have been previously assigned to an inoperable physical port are moved to another physical port (e.g., on another smart NIC).

Figure 13:
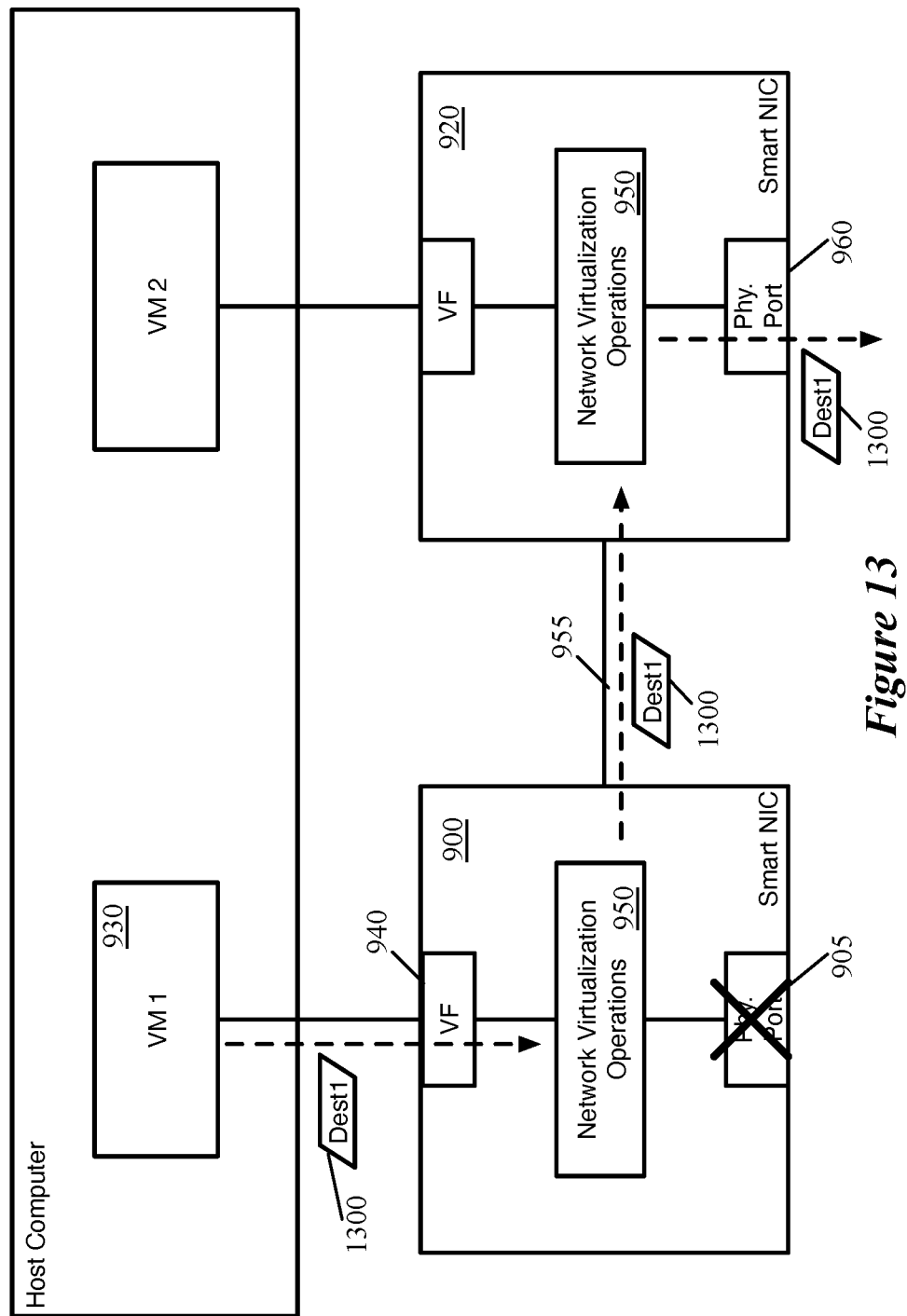
FIG. 13 conceptually illustrates the path of a data message for one of the connections shown in FIG. 10 after the physical port of the smart NIC has gone down.

FIG. 13 conceptually illustrates the path of a data message for one of the connections shown in FIG. 10 after the physical port 905 of the first smart NIC 900 has gone down. This could occur due to a problem with the smart NIC itself, the physical cable that connects the port 905 to the datacenter network becoming disconnected, etc. As shown, another data message 1300 directed to Dest1 is sent from the VM 930 to the smart NIC 900 via the VF 940. The smart NIC 900 processes the data message according to the configured network virtualization operations 950, which determines that the data message should be output to the physical network but that the physical port 905 previously used for this connection is no longer up. As such, the connection is now re-balanced to use the other physical port 960 of the second smart NIC 920. The data message 1300 is thus sent to the second smart NIC 920 via the private communication channel 955. In some embodiments, the first smart NIC 900 also provides context information indicating that network virtualization operations have been performed on the data message 1300 and that it should be output via the physical port 960 of the second smart NIC 920. The second smart NIC 920 receives the second data message 1300 via the private communication channel 955 and outputs this data message 1300 to the physical network via its physical port 960.

In many situations, the smart NICs receive configuration data for the virtual networking operations from a network management and control system. Such a network management and control system, in some embodiments, receives data defining networking operations (e.g., defining logical networks), security operations, etc. from a user (e.g., networking and/or security administrators) and uses this definitional data to generate configuration data for the various network elements (e.g., forwarding elements such as virtual switches and routers, middlebox elements such as distributed firewalls, etc.) and provide the configuration data to the network elements so that the network elements can implement the various networking and security operations. Such network elements include the smart NICs that perform network virtualization operations.

Each of the ports of the different smart NICs (possibly including a management port) has its own network address, but many network management and control systems treat each host computer as a single entity. For instance, for host computers that do not use smart NICs for network virtualization operations, the network management and control systems of some embodiments communicate with an agent in the hypervisor of the host computer. The network management and control system uses a single management network address for each host computer and thus should not directly communicate with all of the multiple smart NICs of a host computer.

In some embodiments, the smart NICs use clustering technology in order to appear to the network management and control system as a single entity for the host computer. For instance, in some embodiments, the smart NICs of a host computer perform a leader election to determine a single one of the smart NICs that communicates with the network management and control system. In some such embodiments, each of the smart NIC operating systems runs a deterministic algorithm that selects one of the smart NICs as the point of contact. Any messages needed for this leader election are communicated over the private communication channel.

Figure 14:
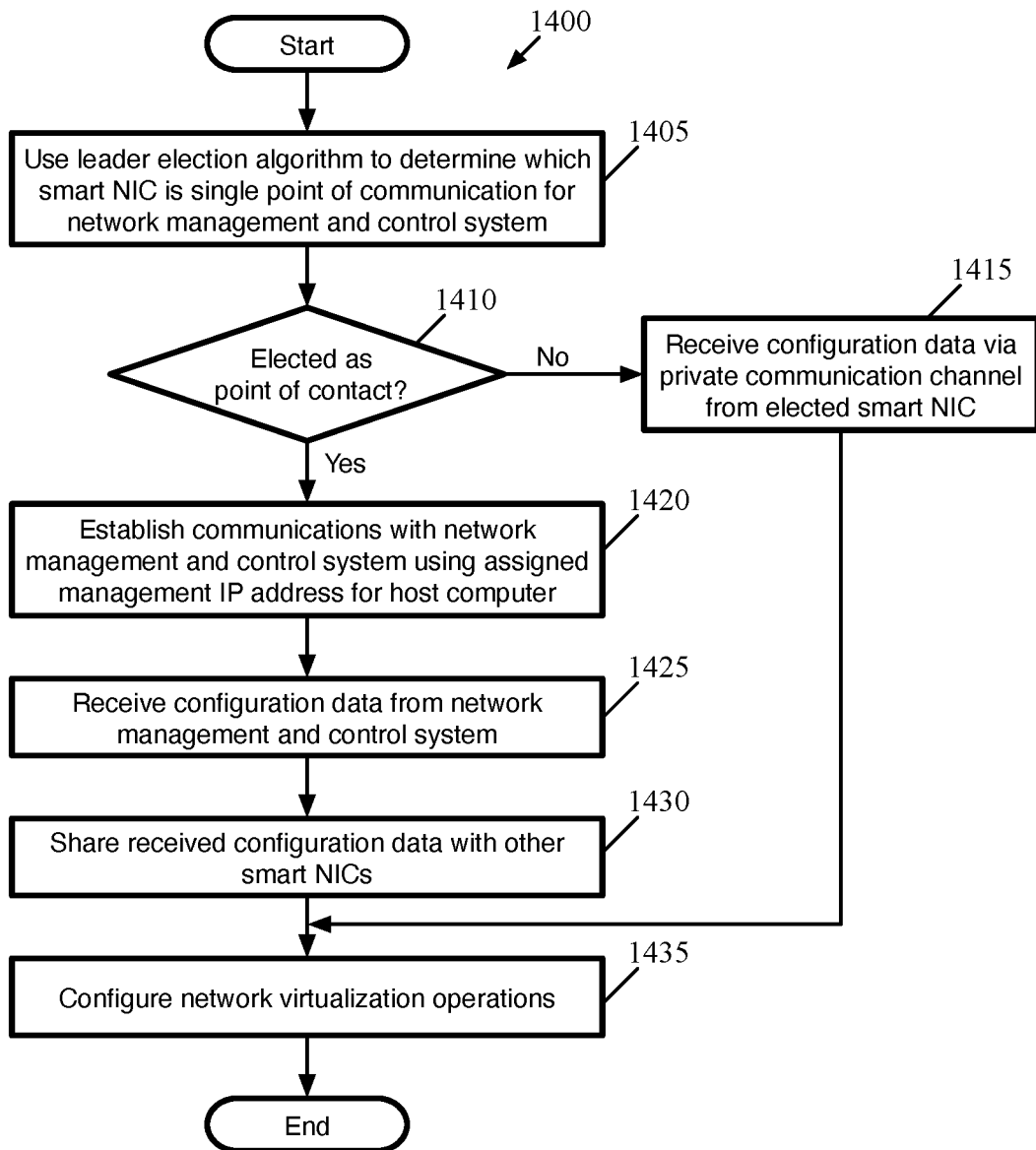
FIG. 14 conceptually illustrates a process of some embodiments for configuring multiple smart NICs to perform network virtualization operations.

FIG. 14 conceptually illustrates a process 1400 of some embodiments for configuring multiple smart NICs to perform network virtualization operations. In some embodiments, the process 1400 is performed independently by each of a set of smart NICs of a host computer when the smart NICs are brought online (e.g., when the host computer is booted up). The process 1400 may also be performed (again, independently by each smart NIC of the host computer) in response to a change in smart NIC team membership (e.g., addition of a smart NIC to the NIC team or removal of a smart NIC from the NIC team, whether by external action or NIC failure). In some embodiments, the smart NICs monitor team membership using beaconing or keep-alive messages (e.g., sent via the private communication channel). The process 1400 is described in part by reference to FIGS. 15 and 16, which illustrate operations of a pair of smart NICs 1500 and 1505 of a host computer (not shown).

Figure 15:
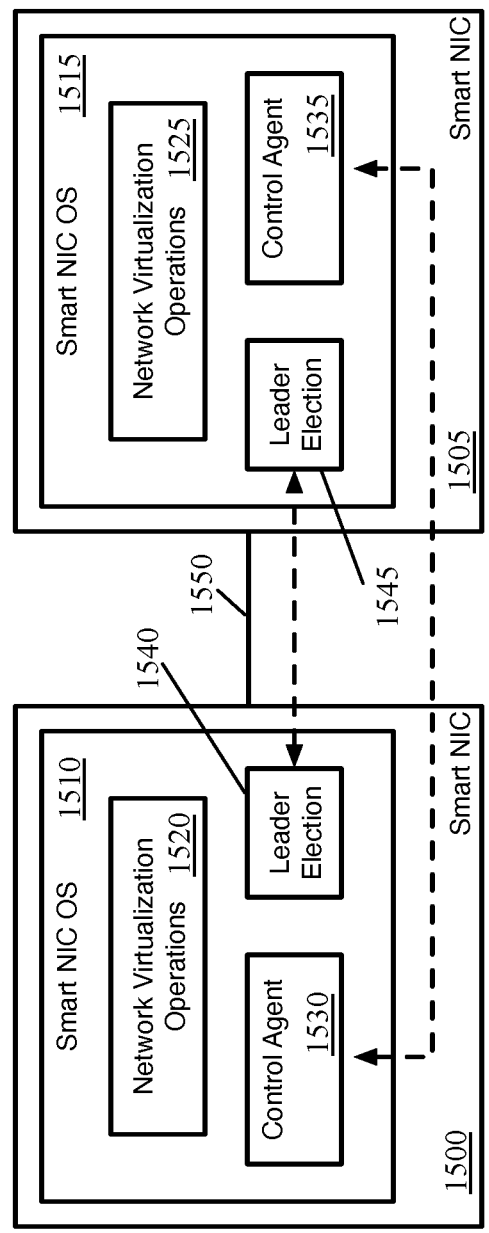
FIG. 15 illustrates that each of a pair of smart NICs respectively executes a smart NIC operating system with a leader election module.

FIG. 15 illustrates that each of the smart NICs 1500 and 1505 respectively executes a smart NIC operating system 1510 and 1515. The smart NIC operating systems include multiple modules, such as network virtualization operations 1520 and 1525, control agents 1530 and 1535, and leader election modules 1540 and 1545. A private communication channel 1550 connects the two smart NICs and allows communication between the smart NICs (e.g., for sending data messages, configuration data, etc.).

The control agents 1530 and 1535, in some embodiments, communicate with a network management and control system that configures network virtualization operations on numerous host computers in a datacenter (e.g., by provisioning these host computers to perform switching and/or routing to implement logical networks). The control agents 1530 and 1535 receive configuration data from this network management and control system and use the configuration data to properly configure their respective network virtualization operations 1520 and 1525. The control agents 1530 and 1535 are able to communicate with each other via the private communication channel 1550.

The leader election modules 1540 and 1545 perform leader election to assign one of the smart NICs as the leader for a particular task (e.g., communication with the network management and control system). The leader election modules 1540 and 1545 may communicate via the private communication channel 1550 in order to confirm leader elections for a task, share identifying information so that each leader election module is aware of all of the smart NICs of a host computer that can be chosen as the leader for a task, etc.

As shown, the process 1400 begins by using (at 1405) a leader election algorithm to determine which smart NIC is the single point of communication for the network management and control system. In some embodiments this leader election algorithm is a deterministic algorithm performed separately on each individual smart NIC of the group of smart NICs for a host computer. That is, if there are five smart NICs, then each of the five smart NICs runs the leader election algorithm to arrive at the same elected leader. An example of such an algorithm is a hash-based decision that hashes identifiers for the five smart NICs and computes the resultant hash modulo five (the number of smart NICs) to determine the leader. In other embodiments, the leader election algorithm involves communication and/or negotiation between the smart NICs to arrive at an elected leader smart NIC that is designated to communicate with the network management and control system.

Figure 16:
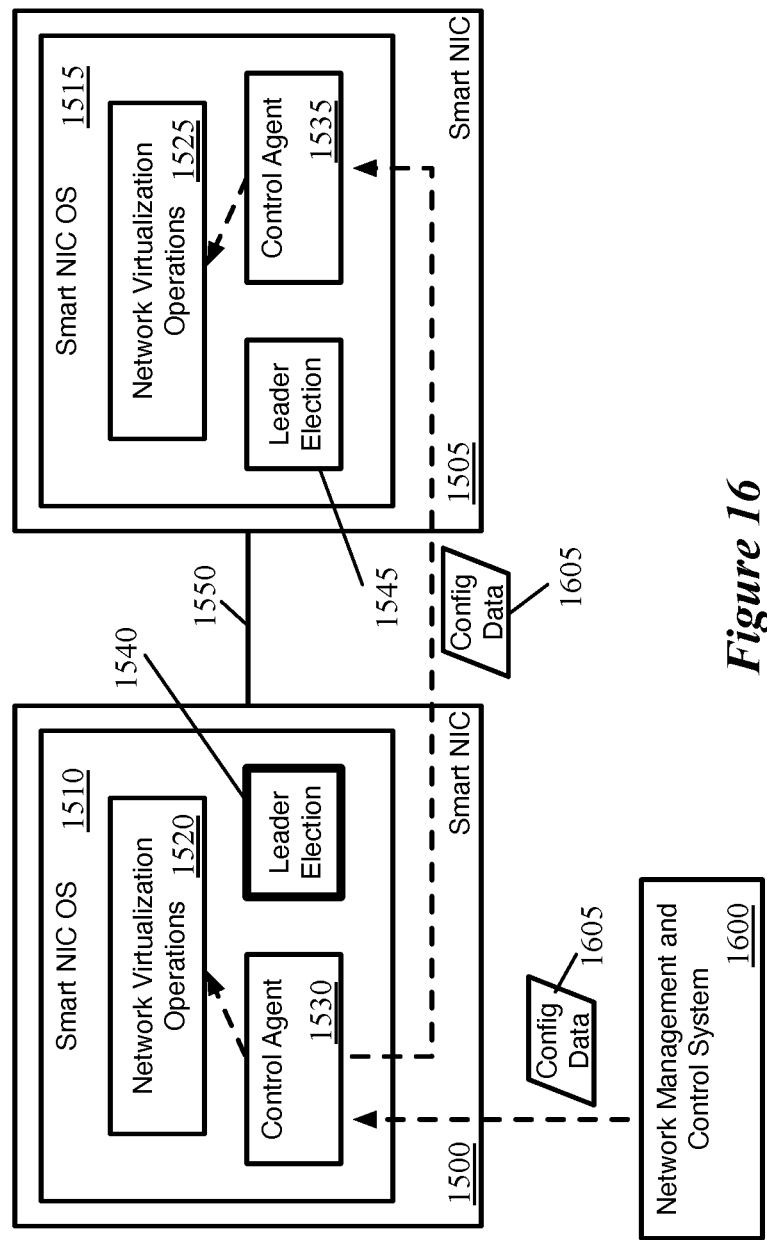
FIG. 16 illustrates the distribution of configuration data to multiple smart NICs.

Once this election has been completed, the process 1400 determines (at 1410) whether the current smart NIC (i.e., the smart NIC performing this process) is elected as the point of contact. It should be understood that the process 1400 is a conceptual process and that each smart NIC does not necessarily make such a specific determination. Rather, the smart NIC that is elected as the leader performs a first set of operations and the other smart NICs perform a different set of operations after the leader election. In the example of FIG. 16, which illustrates the distribution of configuration data to multiple smart NICs, the leader election module 1540 is bolded to indicate that the smart NIC 1500 has been elected as the leader to communicate with the network management and control system 1600.

For smart NICs that are not the elected point of contact with the network management and control system, the process 1400 eventually receives (at 1415) configuration data via a private communication channel from the elected smart NIC. It should be noted that this will not occur until the elected smart NIC receives this configuration data from the network management and control system and distributes that data to the other smart NICs.

At the smart NIC that is elected as the point of contact with the network management and control system, the process establishes (at 1420) communications with the network management and control system using an assigned management IP address for the host computer. In some embodiments, each host computer is treated as a single entity by the network management and control system, which may not be concerned with the internal networking implementation on each host computer. To establish communications, in some embodiments the elected smart NIC sends a message or set of messages from the management IP address to the network management and control system. In some embodiments, the network management and control system will automatically use the assigned IP address, but the elected smart NIC needs to advertise to the datacenter network that messages sent to that IP address should be directed to a particular one of its ports that uses the IP address.

Once communication is established, the process receives (at 1425) configuration data from the network management and control system. This configuration data, in some embodiments, specifies how data messages should be handled by smart NICs. The configuration data can include routing tables, virtual switch configuration, firewall rules, network address translation rules, load balancing rules, etc. In some embodiments, the configuration data is in a particular format for the particular type of network virtualization software running on the smart NIC operating system. In other embodiments, the configuration data is in a generic format and the controller agent on each smart NIC is responsible for converting the data into the particular format for the network virtualization software. FIG. 16 illustrates that the network management and control system 1600 provides configuration data 1605 to the control agent 1530 of the smart NIC 1500 that has been elected as the point of contact for the network management and control system 1600.

Next, the process shares (at 1430) the received configuration data with the other smart NICs (i.e., those smart NICs that do not communicate directly with the network management and control system). This data is provided to the other smart NICs via the private communication channel between the smart NICs. It is also at this point that the other smart NICs reach operation 1415 in their own processes, as they are now able to receive the configuration data.

The process 1400 (whether being performed on the elected smart NIC or on one of the other smart NICs) next configures (at 1435) the network virtualization operations on that smart NIC based on the configuration data. As mentioned, in some embodiments the control agent uses the configuration data received from the network management and control system (e.g., as a first set of data tuples) to generate the configuration data for the network virtualization operations (e.g., as a second set of data tuples). In some embodiments, the network virtualization operations and/or the control agent in the smart NIC operating system also program the data message processing ASIC of the smart NIC based on this configuration data. The process 1400 then ends, although in practice the elected smart NIC will receive updates regularly from the network management and control system as configuration changes are provided to the system.

FIG. 16 shows that the control agent 1530 on the elected smart NIC 1500 provides the configuration data 1605 to the control agent 1535 on the second smart NIC 1505 (e.g., via the private communication channel 1550). The control agent 1530 also uses this configuration data 1605 to configure the network virtualization operations 1520 on its smart NIC 1500, while the control agent 1535 on the second smart NIC 1505 uses the configuration data 1605 to configure its respective network virtualization operations 1525.

In addition to disseminating the configuration data from the network management and control system, in some embodiments the leader smart NIC receives information from the other smart NICs via the private communication channel. In some embodiments, this information includes statistics (e.g., data message processing statistics), status/monitoring information, and other data. In some embodiments, the elected leader smart NIC performs various monitoring tasks based on this information (e.g., ensuring that the various smart NICs are currently operable and sending message to other smart NICs if one of the smart NICs goes down).

Figure 17:
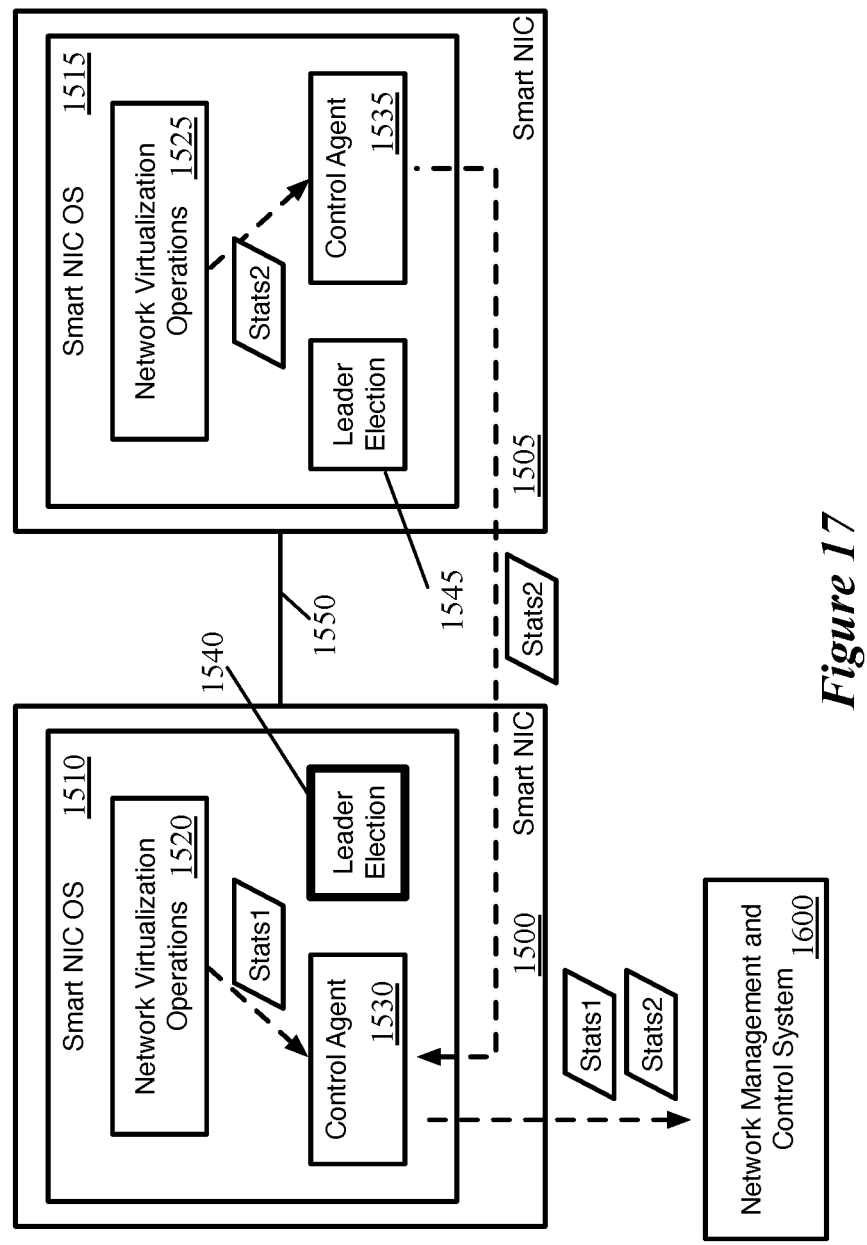
FIG. 17 conceptually illustrates an elected leader smart NIC collecting statistics from itself and another smart NIC and reporting those statistics to the network management and control system.

In some embodiments, some of the shared information is reported to the network management and control system. FIG. 17 conceptually illustrates the elected leader smart NIC 1500 collecting statistics from itself and the other smart NIC 1505 and reporting those statistics to the network management and control system 1600. As shown, the control agents 1530 and 1535 collect statistics from their respective sets of network virtualization operations 1520 and 1525. The control agent 1535 provides these statistics via the private communication channel 1550 to the control agent 1530 at the leader smart NIC 1500. At least some of these statistics from both smart NICs are sent from the control agent 1530 to the network management and control system 1600. In some embodiments, the control agent 1530 or another module on the elected leader smart NIC 1500 aggregates the statistics so that the network management and control system 1600 is provided information that appears to come from a single entity.

This collected information may be used by the network management and control system 1600 to monitor the host computer and/or individual smart NICs. The network management and control system may also use this information to modify the virtual networking configuration for the smart NICs, in which case the network management and control system provides configuration updates to the leader smart NIC that in turn distributes these updates to the other smart NICs via the private communication channel.

In some embodiments, the network management and control system includes multiple components that perform different functions and provide different configuration data to the host computers (in addition to receiving different data from the host computers). For instance, the network management and control system of some embodiments includes both a management plane (MP) and central control plane (CCP). The MP receives the configuration data from administrators, persists this data, and provides certain configuration information to host computers. In addition, in some embodiments, the host computers provide statistics, status, and other real-time data to the MP. The CCP, in some embodiments, receives network configuration data from the MP, determines the host computers (and other forwarding elements, such as gateways) that require each portion of the network configuration data, and provides this data to agents on these host computers.

In some embodiments, the smart NICs elect multiple different leaders for multiple different tasks. For instance, some embodiments elect one leader for receiving configuration data, another leader for collecting flow statistics, a third leader for collecting monitoring data, etc. In some embodiments, one leader is elected for communication with the MP and a second leader is elected for communication with the CCP. These leader elections may use different hash functions or different inputs to the same hash function in order to arrive at different smart NICs as the elected leader. In some embodiments, if a smart NIC is elected for communication with the MP then that smart NIC is removed from consideration for communication with the CCP, so as to ensure the load is shared.

Figure 18:
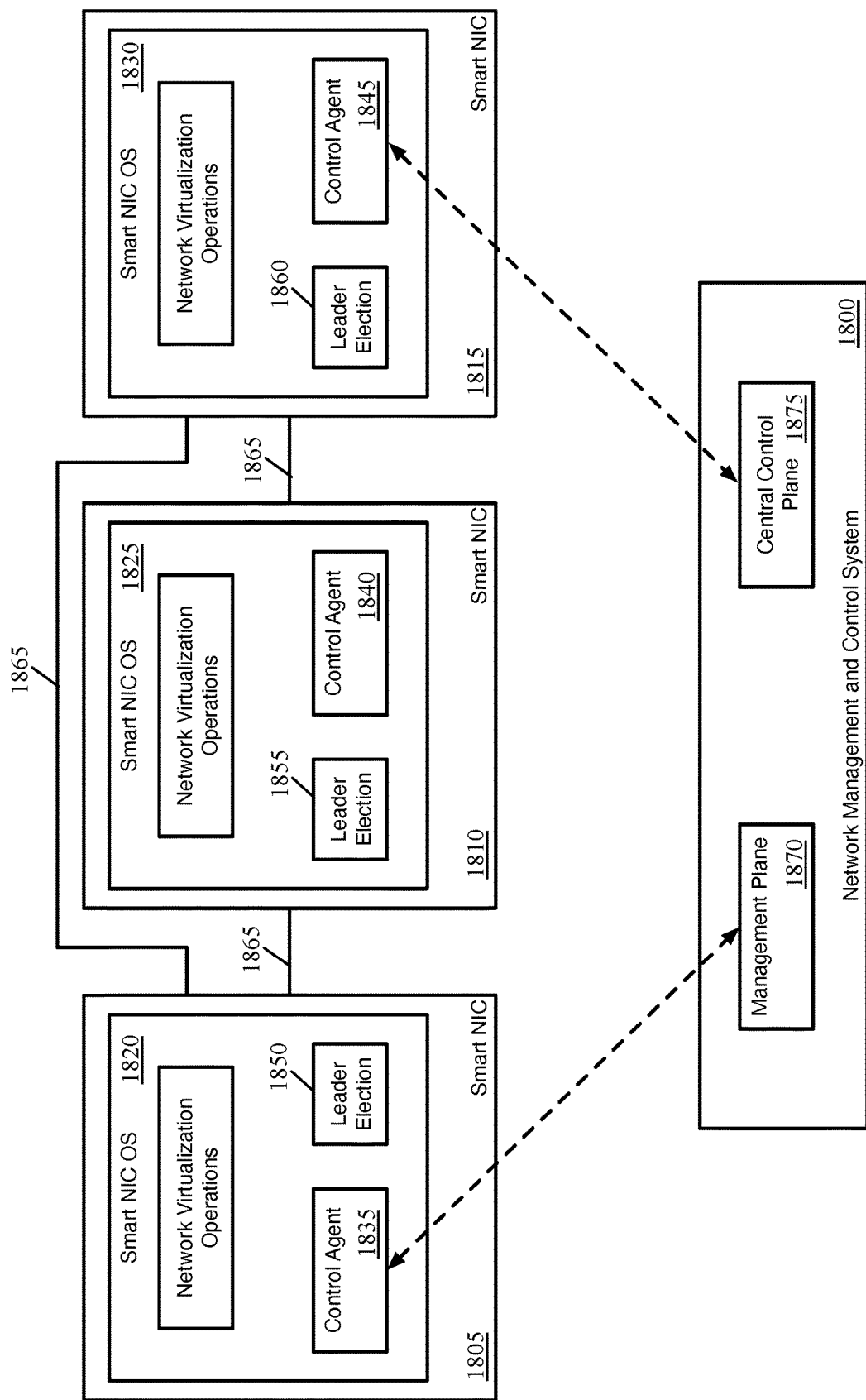
FIG. 18 conceptually illustrates three smart NICs of a host computer that respectively operate smart NIC operating systems with leader election modules.

FIG. 18 conceptually illustrates three smart NICs 1805-1815 of a host computer (not shown) that respectively operate smart NIC operating systems 1820-1830. As in the previous figures, each of the smart NIC operating systems 1820-1830 includes a respective control agent 1835-1845 and leader election module 1850-1860. In addition, each of the smart NICs 1805-1815 is connected to the other smart NICs via a private communication channel 1865.

In addition, a network management and control system 1800 that includes both an MP 1870 and a CCP 1875 communicates with the smart NICs 1805-1815. Here, the leader election modules 1850-1860 have designated the first smart NIC 1805 as the point of contact for the MP 1870 and have designated the third smart NIC 1815 as the point of contact for the CCP 1875. As such, the control agent 1835 on the first smart NIC 1805 communicates with the MP 1870 and the control agent 1840 on the third smart NIC 1815 communicates with the CCP 1875. In some embodiments, each of the smart NIC operating systems actually runs separate MP agents and CP agents, with the elected MP agent communicating with the MP 1870 and the elected CP agent communicating with the CCP 1875.

For various purposes, the smart NICs also use the private communication channel to synchronize dynamic state information in some embodiments. That is, when a first smart NIC receives or creates a set of dynamic state information, that first smart NIC uses the private communication channel to provide the same set of dynamic state information to one or more of the other smart NICs. Different types of state may be shared with a single other smart NIC or multiple (or all) other smart NICs of a given host computer. The synchronization of dynamic state information allows for that information to be preserved if one of the smart NICs fails, rather than the state information being lost. A smart NIC might fail due to an electrical short, disconnection, overheating, etc.

As mentioned, an elected leader smart NIC among the group of smart NICs for a host computer might collect monitoring data from all of the other smart NICs. Either this collected data or data generated from the collected data could include dynamic state information that is synchronized to at least one backup smart NIC. Therefore, if the leader smart NIC fails, the monitoring state information is available for the next leader to retrieve.

Figure 19:
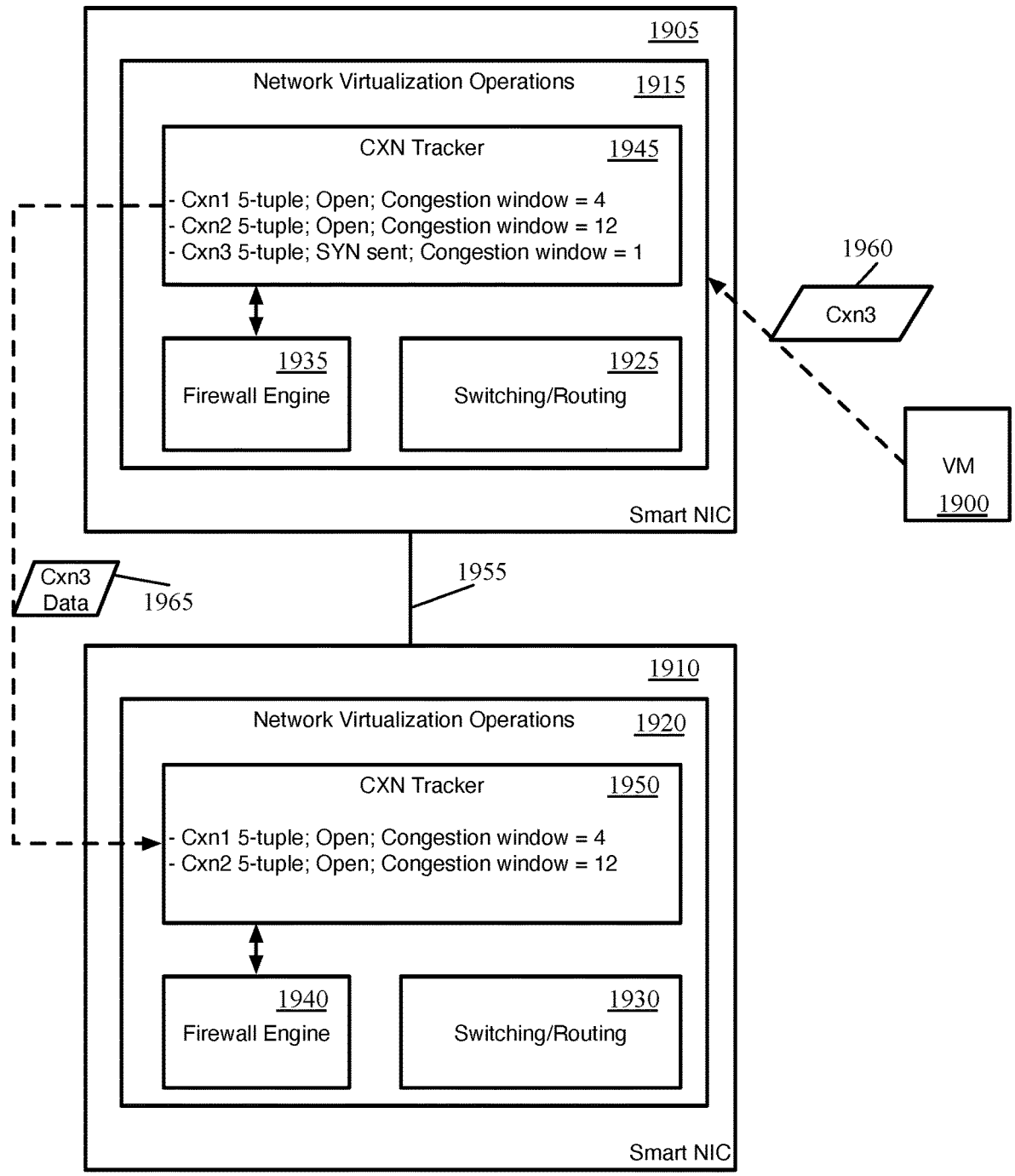
FIG. 19 conceptually illustrates two smart NICs that share connection state.

In addition, when performing virtual networking processing, the smart NICs may need to store dynamic state information and share that data with each other. FIG. 19 conceptually illustrates two smart NICs 1905 and 1910 that share connection state. As in previous figures, each of the smart NICs (e.g., within the smart NIC operating system) performs network virtualization operations 1915 and 1920. These operations include switching & routing 1925 and 1930 as well as firewall engines 1935 and 1940 that perform firewall operations (i.e., determining whether to allow, block, or drop data messages based on the headers of those data messages). The firewall operations are stateful, in some embodiments, and thus use information from respective connection trackers 1945 and 1950.

The connection trackers 1945 and 1950 store information about open connections that are processed by the smart NICs. As shown, some embodiments store, for each open connection, at least a 5-tuple (source and destination IP addresses, source and destination transport layer ports, transport layer protocol), the current state of the connection, and a congestion window for the connection. This connection information is dynamic state that the connection trackers 1945 and 1950 synchronize over the private communication channel 1955 between the smart NICs.

As shown, the connection tracker 1945 on the first smart NIC 1905 stores information for two open connections (cxn1 and cxn2), along with a congestion window for these open connections. Other embodiments may also store additional data (e.g., a receiver window). The firewall engines 1935 and 1940 use this dynamic connection state information from their respective connection trackers to process data messages sent to and from the DCNs on their host computer. Information as to whether a particular connection has been opened (e.g., completed a three-way handshake) allows the firewall engines 1935 and 1940 to determine whether a data message should be allowed or not. The congestion window is a dynamic state variable determined by the connection endpoints (and learned by the smart NICs) that limits the amount of data for a particular connection that can be sent onto the network (i.e., from a physical port of one of the smart NICs), and typically starts out small and increases up to a maximum (which may be set by the receiver window).

If connection state were to be lost for an ongoing connection (e.g., because the smart NIC storing that connection state in its connection tracker failed), then depending on the firewall engine settings, either all of the traffic for that connection would be blocked by the firewall engine of the smart NIC that picked up the connection or the firewall engine on that smart NIC would need to re-learn the connection state from the endpoints. In the first option, not only would the connection need to be re-established, but the congestion window would start out small again, limiting the amount of data that could be transmitted. The latter option avoids dropping the connection but at the cost of a window of lax security enforcement.

As such, the connection trackers 1945 and 1950 share their dynamic state information with each other to avoid requiring either of these options. At this point, the state information for cxn1 and cxn2 has already been shared;

these connections could be processed by either of the smart NICs 1905 and 1910. At this point, a VM 1900 is in the process of opening a new connection (cxn3) and sending data message(s) 1960 for this connection to the network virtualization operations 1915 on the first smart NIC 1905 (i.e., the smart NIC to which the VM 1900 is bound). Accordingly, the connection tracker 1945 also synchronizes this connection state data 1965 to the connection tracker 1950. In some embodiments each smart NIC synchronizes its connection state data (or other state data) only to one other smart NIC while in other embodiments each smart NIC synchronizes its connection state data (or other state data) to all of the other smart NICs.

Different embodiments synchronize dynamic state information at different intervals. Some embodiments synchronize each change through the private communication channel, while other embodiments synchronize state data at regular time intervals (e.g., every 1 ms, every 100 ms, every second, every 5 seconds, etc.). If the private communication channel is a purpose-built channel, then this may enable very fast (e.g., every 1 ms or so) synchronization. In addition, some embodiments use a mechanism in the smart NIC to write connection state (or other synchronized data) to a specific memory region in that smart NIC with this write automatically mirrored to a peer memory region on another smart NIC, enabling even faster synchronization (e.g., a delay of less than 10 μs). If the synchronization interval is longer (a higher delay) such that the congestion window cannot be accurately synchronized, some embodiments only synchronize the basic connection state (i.e., whether the connection is open and allowed). In the case of failure of a first smart NIC that processes a particular connection, the new smart NIC that starts processing that connection allows traffic for the connection until that new smart NIC has learned the congestion window for the connection.

Figure 20:
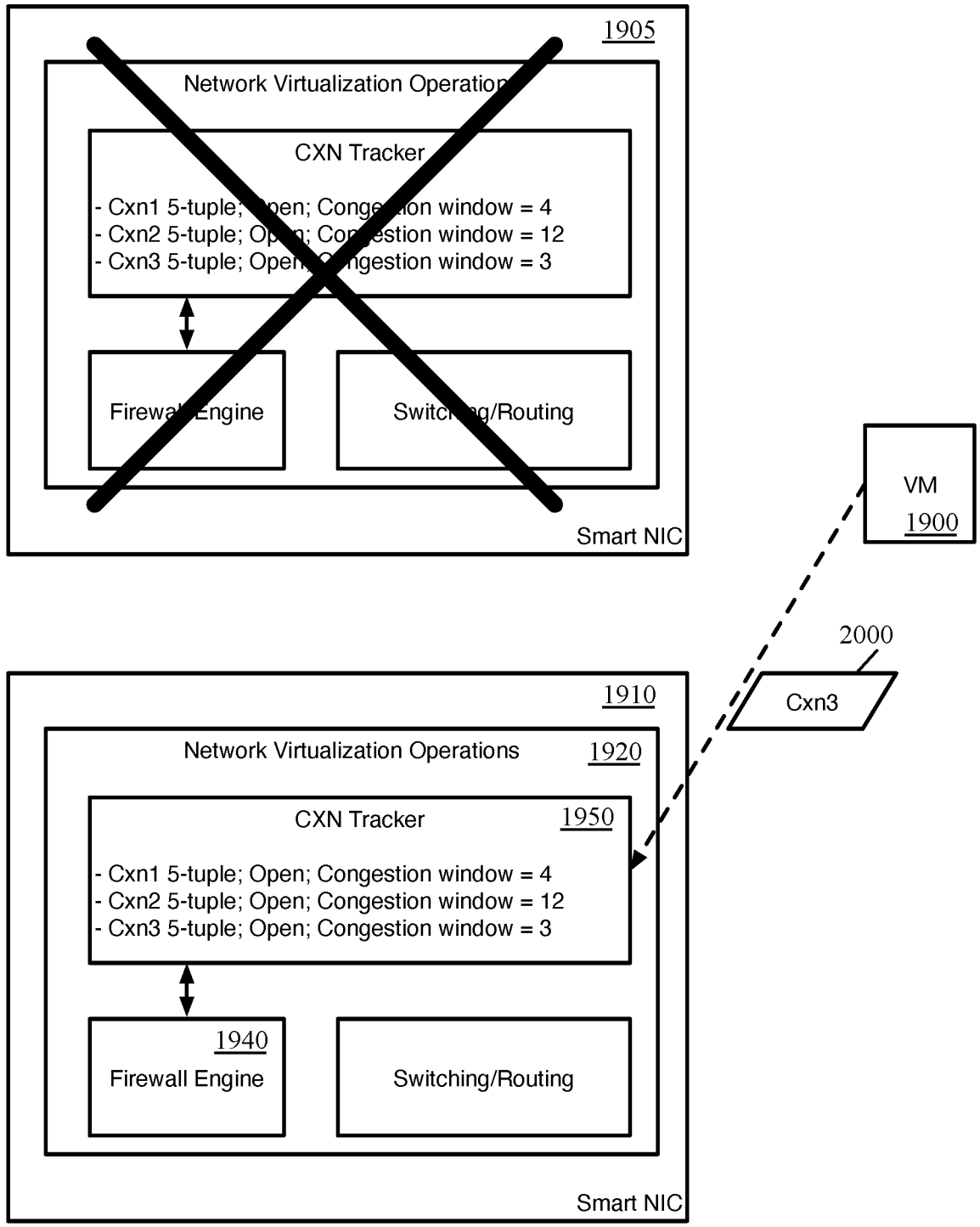
FIG. 20 illustrates that a first smart NIC in FIG. 19 has become inoperable while connections remain open and that a VM previously bound to the first smart NIC is now bound to an interface of a second smart NIC.

While the VM 1900 is bound to the first smart NIC 1905 (and assuming that this connection is sent to and from a physical port of this first smart NIC 1905), the second smart NIC 1910 does not actually have any use for this information. However, FIG. 20 illustrates that the first smart NIC 1905 has become inoperable while these connections remain open, and so the VM 1900 is now bound to an interface of the second smart NIC 1910. This does not mean that the VM needs to restart all of its connections, because this information has been synchronized from the first smart NIC 1905. Depending on the configuration, if there are more than two smart NICs, all of the VMs that were bound to the now-inoperable smart NIC move over to the same smart NIC or are balanced across all of the remaining smart NICs in different embodiments.

As shown, the VM 1900 continues sending data messages 2000 (now to the second smart NIC 1910) for cxn3. Because the current state of this connection is that it is now open with a congestion window of 3 (prior to the failure of the first smart NIC 1905), the firewall engine 1940 is able to process these data messages without requiring that the connection or its congestion window restart.

This sort of state sharing may also be used by smart NICs that are performing operations other than virtual networking (or that perform multiple types of operations for which state sharing is used). If storage virtualization operations are handled by the smart NICs, then in some embodiments the storage virtualization functions include running a network stack to manage a transport layer (e.g., TCP) connection to the storage. In this case, connection information should again be shared between smart NICs in case of failover, so that these connections are not reset if one of the smart NICs fails.

Figure 21:
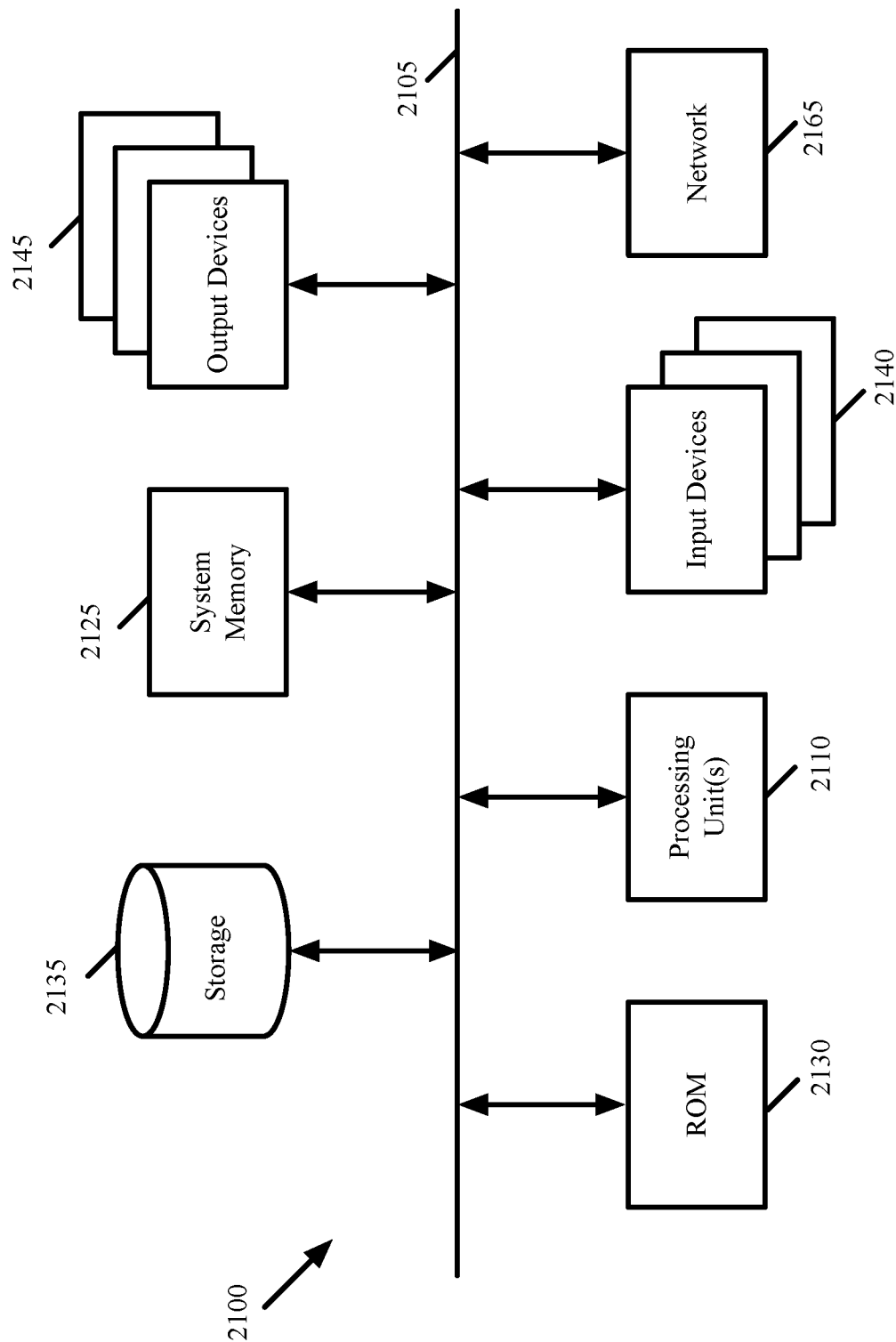
FIG. 21 conceptually illustrates an electronic system with which some embodiments of the invention are implemented.

FIG. 21 conceptually illustrates an electronic system 2100 with which some embodiments of the invention are implemented. The electronic system 2100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2100 includes a bus 2105, processing unit(s) 2110, a system memory 2125, a read-only memory 2130, a permanent storage device 2135, input devices 2140, and output devices 2145.

The bus 2105 collectively represents all system, peripheral, and chipset buses that communicatively connect the numerous internal devices of the electronic system 2100. For instance, the bus 2105 communicatively connects the processing unit(s) 2110 with the read-only memory 2130, the system memory 2125, and the permanent storage device 2135.

From these various memory units, the processing unit(s) 2110 retrieve instructions to execute and data to process in order to execute the processes of the invention. The processing unit(s) may be a single processor or a multi-core processor in different embodiments.

The read-only-memory (ROM) 2130 stores static data and instructions that are needed by the processing unit(s) 2110 and other modules of the electronic system. The permanent storage device 2135, on the other hand, is a read-and-write memory device. This device is a non-volatile memory unit that stores instructions and data even when the electronic system 2100 is off. Some embodiments of the invention use a mass-storage device (such as a magnetic or optical disk and its corresponding disk drive) as the permanent storage device 2135.

Other embodiments use a removable storage device (such as a floppy disk, flash drive, etc.) as the permanent storage device. Like the permanent storage device 2135, the system memory 2125 is a read-and-write memory device. However, unlike storage device 2135, the system memory is a volatile read-and-write memory, such a random-access memory. The system memory stores some of the instructions and data that the processor needs at runtime. In some embodiments, the invention's processes are stored in the system memory 2125, the permanent storage device 2135, and/or the read-only memory 2130. From these various memory units, the processing unit(s) 2110 retrieve instructions to execute and data to process in order to execute the processes of some embodiments.

The bus 2105 also connects to the input and output devices 2140 and 2145. The input devices enable the user to communicate information and select commands to the electronic system. The input devices 2140 include alphanumeric keyboards and pointing devices (also called "cursor control devices"). The output devices 2145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 21, bus 2105 also couples electronic system 2100 to a network 2165 through a network adapter (not shown). In this manner, the computer can be a part of a network of computers (such as a local area network ("LAN"), a wide area network ("WAN"), or an Intranet, or a network of networks, such as the Internet. Any or all components of electronic system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 8 and 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for synchronizing state between a plurality of smart network interface controllers (NICs) of a host computer that perform operations using dynamic state information, the method comprising:

at a first smart NIC of the plurality of smart NICs of the host computer, storing a set of dynamic connection state information that the first smart NIC uses to perform stateful processing of data messages belonging to a plurality of ongoing connections between data compute machines executing on the host computer and other endpoints external to the host computer, the dynamic connection state information comprising connection tracking data, the connection tracking data comprising a list of active transport layer connections; and synchronizing the set of dynamic connection state information to at least a second smart NIC of the plurality of smart NICs of the host computer, across a communication channel that connects the plurality of smart NICs of the host computer, so that each of the second smart NIG also stores the set of dynamic connection state information, wherein the second smart NIC uses the dynamic connection state to perform stateful processing of data messages belonging to at least a subset of the ongoing connections between the machines executing on the host computer and other endpoints when the first smart NIC fails;

wherein the connection tracking data further comprises congestion windows for each of at least a subset of the active transport layer connections, wherein synchronizing the set of dynamic connection state information allows the second smart NIC to use the congestion window for a particular ongoing connection to perform stateful processing of data messages belonging to the particular connection rather than requiring the particular connection to be re-established and the congestion window for the particular connection reset.

2. The method of claim 1, wherein each of the smart NICs of the host computer executes a smart NIC operating system that performs virtual networking operations, including the stateful processing operations, on data messages sent to and from the data compute machines executing on the host computer using the connection tracking data.

3. The method of claim 1, wherein the virtual stateful processing comprises performing firewall operations that determine whether to allow the data messages.

4. The method of claim 1, wherein the dynamic connection state information comprises tracked storage connection information for performing virtualized storage operations.

5. The method of claim 1, wherein:
   each respective smart NIC in the plurality of smart NICs of the host computer performs stateful processing operations using a respective set of dynamic connection state information;
   the plurality of ongoing connections is a first plurality of ongoing connections and the set of dynamic connection state information is a first set of dynamic connections state information; and
   the method further comprises, upon failure of the second smart NIC, performing stateful processing operations previously performed by the second smart NIC for a second plurality of onging connections between the data compute machines executing on the host computer and other external endpoints by using a second set of dynamic connection state information received from the second smart NIC in a synchronization operation.

6. The method of claim 1, wherein the communication channel is a private communication channel with high bandwidth and low latency.

7. The method of claim 6, wherein the private communication channel is a set of physical cables that only carries communication between the smart NICs.

8. The method of claim 7, wherein the set of physical cables comprises, for each respective pair of smart NICs in the plurality of smart NICs, a respective physical cable connecting the pair of smart NICs.

9. The method of claim 7, wherein each smart NIC in the plurality of smart NICs is directly connected to two other smart NICs via the set of physical cables.

10. The method of claim 7, wherein the set of physical cables connects to a set of one or more physical switches to carry communication between the smart NICs.

11. The method of claim 6, wherein:
    the plurality of smart NICs of the host computer are connected via physical ports to a physical network in order to transmit data to and receive data from other host computers; and
    the private communication channel is a logically private communication channel that utilizes the physical network.

12. The method of claim 11, wherein the logically private communication channel is an overlay network.

13. The method of claim 6, wherein the private communication channel uses a Peripheral Component Interconnect Express (PCie) subsystem of the host computer.

14. A non-transitory machine-readable medium storing a program which when executed by at least one processing unit of a first smart network interface controller (NIC) of a host computer synchronizes state between a plurality of smart network interface controllers (NICs) of host computer that perform operations using dynamic state information, the program comprising sets of instructions for:
    storing a set of dynamic connection state information at the first smart NIC of the host computer that the first smart NIC uses to perform stateful processing of data messages belonging to a plurality of ongoing connections between data compute machines executing on the host computer and other endpoints external to the host computer, the dynamic connection state information comprising connection tracking data; and
    synchronizing the set of dynamic connection state information to at least a second smart NIC of the plurality of smart NICs of the host computer, across a communication channel that connects the plurality of smart NICs of the host computer, so the second NIC also stores the set of dynamic connection state information, wherein the second smart NIC uses the dynamic connection state to perform stateful processing of data messages belonging to at least a subset of the ongoing connections between the machines executing on the host computer and other endpoints when the first smart NIC fails;
    wherein each of the smart NICs of the host computer executes a smart NIC operating system that performs virtual networking operations, including the stateful processing operations, on data messages sent to and from the data compute machines executing on the host computer using the connection tracking data;
    wherein the connection tracking data comprises (i) a list of active transport layer connections and (ii) congestion windows for each of at least a subset of the active transport layer connections, wherein synchronizing the set of dynamic connection state information allows the second smart NIC to use the congestion window for a particular ongoing connection to perform stateful processing of data messages belonging to the particular connection rather than requiring the particular connection to be re-established and the congestion window for the particular connection reset.

15. The non-transitory machine-readable medium of claim 14, wherein:
    each respective smart NIC in the plurality of smart NICs of the host computer performs stateful processing operations using a respective set of dynamic connection state information;
    the plurality of ongoing connections is a first plurality of ongoing connections and the set of dynamic connection state information is a first set of dynamic connections state information; and
    the program further comprises a set of instructions for, upon failure of the second smart NIC, performing stateful processing operations previously performed by the second smart NIC for a second plurality of onging connections between the data compute machines executing on the host computer and other external endpoints by using a second set of dynamic connection state information received from the second smart NIC in a synchronization operation.

16. The non-transitory machine-readable medium of claim 14, wherein:
    the communication channel is a set of physical cables that only carries communication between the smart NICs; and
    the set of physical cables comprises, for each respective pair of smart NICs in the plurality of smart NICs, a respective physical cable connecting the pair of smart NICs.

17. The non-transitory machine-readable medium of claim 14, wherein:
- the communication channel is a set of physical cables that only carries communication between the smart NICs; and
- the set of physical cables connects to a set of one or more physical switches to carry communication between the smart NICs.

18. The non-transitory machine-readable medium of claim 14, wherein:
- the smart NICs are connected via physical ports to a physical network in order to transmit data to and receive data from other host computers; and
- the communication channel is a logically private communication channel that utilizes the physical network.

19. The non-transitory machine-readable medium of claim 14, wherein the communication channel uses a Peripheral Component Interconnect Express (PCie) subsystem of the host computer.

* * * * *